United States Patent
Shields et al.

(10) Patent No.: US 10,382,208 B2
(45) Date of Patent: *Aug. 13, 2019

(54) SECURE COMMUNICATIONS USING ORGANICALLY DERIVED SYNCHRONIZED PROCESSES

(71) Applicant: Olympus Sky Technologies, S.A., Lodz (PL)

(72) Inventors: Jon Barton Shields, Escondido, CA (US); David Gell, San Diego, CA (US)

(73) Assignee: OLYMPUS SKY TECHNOLOGIES, S.A., Lodz (PL)

( * ) Notice: Subject to any disclaimer, the term of this patent is extended or adjusted under 35 U.S.C. 154(b) by 0 days.

This patent is subject to a terminal disclaimer.

(21) Appl. No.: 15/813,730

(22) Filed: Nov. 15, 2017

(65) Prior Publication Data

US 2018/0083785 A1    Mar. 22, 2018

Related U.S. Application Data

(63) Continuation-in-part of application No. 15/268,362, filed on Sep. 16, 2016, now Pat. No. 10,263,777.

(Continued)

(51) Int. Cl.
*H04L 29/00*    (2006.01)
*H04L 9/32*    (2006.01)
(Continued)

(52) U.S. Cl.
CPC .......... *H04L 9/3247* (2013.01); *H04L 9/0618* (2013.01); *H04L 9/083* (2013.01);
(Continued)

(58) Field of Classification Search
CPC ....... H04L 9/12; H04L 9/3221; H04L 9/3247; H04L 9/0869; H04L 63/0428;
(Continued)

(56) References Cited

U.S. PATENT DOCUMENTS 6,065,117 A * 5/2000 White ................. G06Q 20/367
                                                    380/255
6,556,544 B1 * 4/2003 Lee ......................... H04L 12/18
                                                    370/256

(Continued)

FOREIGN PATENT DOCUMENTS

WO    2007/043002 A2    4/2007

OTHER PUBLICATIONS

International Search Report and Written Opinion for PCT/US2016/052326, dated Dec. 21, 2016, in 12 pages.

(Continued)

*Primary Examiner* — Don G Zhao
(74) *Attorney, Agent, or Firm* — Procopio, Cory, Hargreaves & Savitch LLP

(57) ABSTRACT

This disclosure provides a system and method for secure communications. The method can enable secure machine-to-machine communications within discrete security groups having two or more communication nodes using a zero knowledge authentication process and related cryptography. A first node in the security group can encrypt payload data using a synchronized data set known to the member nodes of the security group and a parameter data set. A second node in the security group can decrypt the payload data using the seed and the parameter data set. The seed can be provisioned within each node of the security group. The seed can also be provided or changed by a node or another entity to modify the security group membership. Member nodes of the security group can be added or removed as needed. Nodes not having the SDS cannot communicate securely with security group member nodes.

22 Claims, 6 Drawing Sheets

Related U.S. Application Data

(60) Provisional application No. 62/329,762, filed on Apr. 29, 2016, provisional application No. 62/563,547, filed on Sep. 26, 2017.

(51) Int. Cl.
  *H04L 9/06*   (2006.01)
  *H04L 9/08*   (2006.01)
  *H04L 29/08*  (2006.01)
  *H04L 29/06*  (2006.01)
  *H04L 9/14*   (2006.01)
  *H04L 9/12*   (2006.01)
  *H04W 12/02*  (2009.01)
  *H04W 4/70*   (2018.01)
  *H04W 4/50*   (2018.01)

(52) U.S. Cl.
  CPC .......... *H04L 9/0861* (2013.01); *H04L 9/0869* (2013.01); *H04L 9/0891* (2013.01); *H04L 9/12* (2013.01); *H04L 9/14* (2013.01); *H04L 9/3239* (2013.01); *H04L 63/0428* (2013.01); *H04L 63/0435* (2013.01); *H04L 63/105* (2013.01); *H04L 63/123* (2013.01); *H04L 67/1095* (2013.01); *H04W 12/02* (2013.01); *H04L 63/1425* (2013.01); *H04L 63/1441* (2013.01); *H04L 67/12* (2013.01); *H04L 2209/38* (2013.01); *H04W 4/50* (2018.02); *H04W 4/70* (2018.02)

(58) Field of Classification Search
  CPC ............... H04L 63/0435; H04L 63/123; H04L 2209/24; H04L 9/083; H04L 9/3239; H04L 9/0618; H04L 9/0861; H04L 9/0891; H04L 67/1095; H04L 63/105; H04L 9/14; H04L 67/12; H04L 63/1425; H04L 63/1441; H04L 2209/38; H04W 4/70; H04W 12/02; H04W 4/50
  See application file for complete search history.

(56) References Cited

U.S. PATENT DOCUMENTS

| | | | | |
|---|---|---|---|---|
| 6,873,988 | B2* | 3/2005 | Herrmann | H04L 12/2856 |
| 7,260,079 | B1* | 8/2007 | Chapman | H04W 28/20 370/252 |
| 7,546,629 | B2* | 6/2009 | Albert | H04L 12/2856 709/223 |
| 7,554,949 | B2* | 6/2009 | Chen | H04L 63/0227 370/331 |
| 8,582,777 | B2 | 11/2013 | Urivskiy et al. | |
| 8,885,820 | B1 | 11/2014 | Lambert et al. | |
| 2002/0066012 | A1* | 5/2002 | Relander | H04L 9/12 713/151 |
| 2002/0066013 | A1* | 5/2002 | Relander | H04L 9/12 713/151 |
| 2002/0131595 | A1* | 9/2002 | Ueda | G11B 20/00086 380/201 |
| 2002/0164029 | A1* | 11/2002 | Jiang | H04L 9/12 380/270 |
| 2003/0084320 | A1* | 5/2003 | Tarquini | H04L 63/0218 726/25 |
| 2003/0084326 | A1* | 5/2003 | Tarquini | H04L 63/1408 726/23 |
| 2003/0084328 | A1* | 5/2003 | Tarquini | G06F 21/552 726/23 |
| 2003/0084330 | A1* | 5/2003 | Tarquini | H04L 63/1416 726/23 |
| 2003/0159060 | A1* | 8/2003 | Gales | H04L 63/1416 726/23 |
| 2005/0111467 | A1* | 5/2005 | Ng | H04L 29/06 370/401 |
| 2005/0111658 | A1* | 5/2005 | Ida | H04L 9/12 380/28 |
| 2005/0169466 | A1* | 8/2005 | Graunke | H04L 9/12 380/200 |
| 2006/0039553 | A1* | 2/2006 | Suen | H04L 9/065 380/28 |
| 2006/0039556 | A1* | 2/2006 | Suen | H04L 9/0625 380/44 |
| 2006/0233361 | A1* | 10/2006 | Hasegawa | H04L 9/12 380/42 |
| 2009/0077346 | A1* | 3/2009 | Steinert | G06F 9/30087 712/34 |
| 2010/0082988 | A1 | 4/2010 | Huebner et al. | |
| 2010/0299529 | A1 | 11/2010 | Fielder | |
| 2011/0093717 | A1 | 4/2011 | Iwao et al. | |
| 2012/0008787 | A1 | 1/2012 | Wan et al. | |
| 2012/0023557 | A1* | 1/2012 | Bevan | H04L 41/0893 726/4 |
| 2014/0270163 | A1 | 9/2014 | Merchan et al. | |
| 2015/0052364 | A1* | 2/2015 | Edwards | G06F 21/75 713/180 |

OTHER PUBLICATIONS

Extended European Search Report for related EP Patent Application No. 16847491.4, dated Apr. 10, 2019, in 5 pages.

* cited by examiner

| Level | Role | Permission | Minimum Trust Metric |
|---|---|---|---|
| 0 | Not applicable | Not part of security group | 0 |
| 1 | Worker | Receive only | 32 |
| 2 | Worker | Send / Receive | 64 |
| 3 | Administrator | Add members to security group | 128 |
| 4 | Administrator | Remove members from security group | 196 |

US 10,382,208 B2

SECURE COMMUNICATIONS USING ORGANICALLY DERIVED SYNCHRONIZED PROCESSES

CROSS-REFERENCE TO RELATED APPLICATIONS

This application is a continuation-in-part of copending U.S. patent application Ser. No. 15/268,362, filed Sep. 16, 2016, entitled, "SECURE COMMUNICATIONS USING ORGANICALLY DERIVED SYNCHRONIZED PROCESSES," which claims priority to U.S. Provisional Patent Application 62/329,762, filed, Apr. 29, 2016, entitled, "ORGANICALLY DERIVED SYNCHRONIZATION PROCESSES (ODSP) FOR SECURE INTERNET OF THINGS (IOT). This application further claims priority to U.S. Provisional Patent Application 62/563,547, filed, Sep. 26, 2017, entitled, "SECURE COMMUNICATIONS USING ORGANICALLY DERIVED SYNCHRONIZED PROCESSES." The contents of each of these priority applications are hereby incorporated by reference in their entireties.

BACKGROUND

Technological Field

This disclosure relates to secure communications. More specifically, this disclosure relates to machine-to-machine communications using a certificate-free, zero knowledge authentication process and related cryptography.

Related Art

The internet of things (IoT) which includes machine-to-machine communications is a rapidly growing market. The IoT is expect to provide many benefits in a wide range of systems and applications such as automobiles, vending machines, alarm systems, remote sensors, tracking devices for shipping containers, remote monitoring in health applications, and monitoring of industrial equipment. Such systems are highly complex. For example, a modern vehicle may contain over one hundred electronic control units (ECUs) supporting comfort, convenience, and mission critical functions. Connected vehicles additionally contain one or more external communication systems (e.g., wireless gateways).

Communications between devices should be secure to prevent interception of data or insertion of data from an unauthorized entity. Security failures have already occurred and are likely to increase if previous systems are not improved. Secure communications are resistant to interception of the communications by unauthorized entities and resistant to injection of communications from unauthorized entities.

Prior IoT systems have used, for example, certificate-based communication security, such as public key infrastructure (PKI). Characteristics of PKI include certificate management, asymmetrical key exchange and processing, common certificates, third party dependencies, and static seeds. These characteristics lead to high deployment cost and complexity, long link establishment/latency, increased processing power & power consumption, and decreased security for multi-node networks. Thus, in some instances, use of PKI in IoT applications can increase latency and decrease communication efficiency.

SUMMARY

In general, this disclosure describes systems and methods related to secure machine-to-machine communications using a certificate-free, zero knowledge authentication process and related cryptography. The systems, methods and devices of this disclosure each have several innovative aspects, no single one of which is solely responsible for the desirable attributes disclosed herein.

One aspect of the disclosure provides a method for secure communication. The method can include storing, at a first node of a first security group of one or more security groups, a parameter data set containing a plurality of values, the first security group having a first plurality of nodes each having a synchronized data set, the synchronized data set having at least a first seed value. The method can include selecting, using the first seed value, one or more of the plurality of values in the parameter data set to form a first parameter subset. The method can include generating a first cipher key using the first parameter subset at the first node. The method can include encrypting user data at the first node using the first cipher key. The method can include generating a first signature based on the user data. The method can include transmitting, from the first node to a second node of the first security group, a start frame including the parameter data set, the encrypted user data, and the first signature at a first signature location in the start frame. The method can include receiving the start frame at the second node. The method can include selecting one or more of the plurality of values in the parameter data set in the received start frame using the first seed value stored at the second node, to form a second parameter subset equivalent to the first parameter subset. The method can include generating the first cipher key using the second parameter subset decrypting the encrypted user data using the first cipher key. The method can include verifying the first signature in the received start frame.

Another aspect of the disclosure provides a system with secure communication within a security group having a first plurality of nodes. The system can have a first node of the security group, each node of the security group having a synchronized data set, the synchronized data set having at least a first seed. The first node can store a parameter data set containing a plurality of values. The first node can select, using the first seed value, one or more of the plurality of values in the parameter data set to form a first parameter subset. The first node can generate a first cipher key using the first parameter subset at the first node. The first node can encrypt user data at the first node using the first cipher key. The first node can generate a first signature based on the user data. The first node can transmit a start frame including the parameter data set, the encrypted user data, and the first signature at a first signature location in the start frame. The system can have a second node storing the synchronized data set. The second node can receive the start frame. The second node can select one or more of the plurality of values in the parameter data set in the received start frame using the first seed value stored at the second node, to form a second parameter subset equivalent to the first parameter subset. The second node can generate the first cipher key using the second parameter subset. The second node can decrypt the encrypted user data using the first cipher key. The second node can verify the signature in the received start frame.

Another aspect of the disclosure provides a method for secure communication. The method can include storing, at a first node of a first security group of one or more security groups, a parameter data set containing a plurality of values, the first security group having a first plurality of nodes each having a synchronized data set. The synchronized data set can have at least a first seed value. The method can include selecting, using the first seed value stored at the first node, one or more of the plurality of values in the parameter data set to form a first parameter subset. The method can include generating a first cipher key at the first node using the first parameter subset. The method can include encrypting user data at the first node using the first cipher key. The method can include generating a first signature based at least the user data. The method can include transmitting, from the first node to a second node of the first security group, a first start frame including the parameter data set, first encrypted user data, and the first signature at a first signature location in the first start frame.

Other features and advantages of the present disclosure should be apparent from the following description which illustrates, by way of example, aspects of the disclosure.

BRIEF DESCRIPTION OF THE FIGURES

The details of the present invention, both as to its structure and operation, may be gleaned in part by study of the accompanying drawings, in which like reference numerals refer to like parts, and in which.

DETAILED DESCRIPTION

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. However, it will be apparent to those skilled in the art that the disclosure without these specific details. In some instances, well-known structures and components are shown in simplified form for brevity of description.

Organically Derived Synchronized Process (ODSP) can be used for encryption parameter management in presently disclosed systems and methods. ODSP is a certificate-less, zero knowledge authentication based system. ODSP may be used, for example, in systems where communication is between devices that are "known" to each other. ODSP may be implemented, for example, as a software library that integrates into IoT nodes, gateways, backend servers, remote devices, or other communication endpoints where secure communication is desired. Other implementations may use special purpose hardware or a combination of software and hardware. ODSP services can manage key administration, including attack detection and reporting.

Advantageous features of ODSP include low complexity. For example, ODSP systems are certificate-free with no public key exchange or processing. This can accelerate link setup, reduce power consumption and processing overhead, and eliminate certificate administration. Another feature of ODSP is that it is secure and robust, for example, using per session seed and key rotation and robust synchronization and resynchronization. This can allow improved security and detection of compromised communication. ODSP can be used with existing cryptography techniques thereby leveraging certified and standards compliant hardware and software libraries. This can facilitate quick system deployment.

Figure 1:
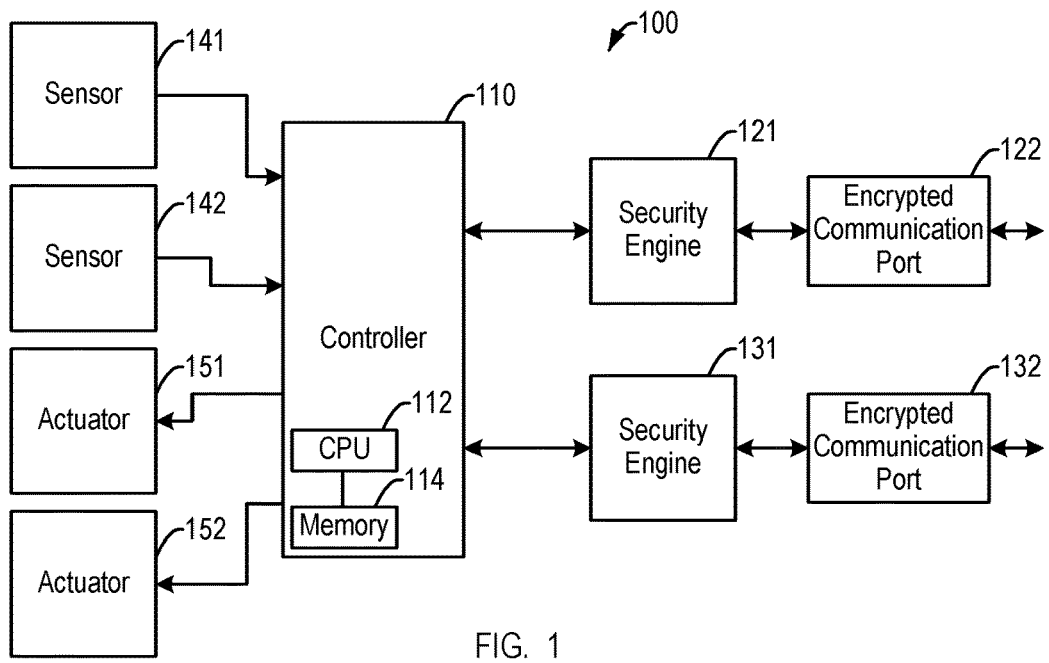
FIG. 1 is a functional block diagram of a communication node.

FIG. 1 is a functional block diagram of a communication node. A communication node (node) 100 includes a controller 110. The controller 110 may include a processor 112 (e.g., processing entity, central processing unit, processor, or CPU) and a memory 114. The controller 110 provides functions according to the particular functions of the node 100. If the node 100 is an automotive engine control module, the controller 110 may, for example, control ignition timing and fuel injection in a vehicle.

The controller 110 receives information from a first sensor 141 and a second sensor 142. The sensors 141, 142 may provide environmental information, for example, temperature, pressure or other environmental or mechanical measurements to the controller 110. The controller 110 provides commands to a first actuator 151 and a second actuator 152. The actuators may, for example, move mechanical components. The numbers and types of sensors and actuators may vary with the function of the node 100. In some embodiments, the commands provided to the actuators 151, 152 by the controller 110 can be based at least in part on the environmental information provided by the sensors 141, 142. In addition, while the controller 110 is described as having the processor 112, the sensors 141, 142 and/or actuators 151, 152 can have, or be associated with their own individual processor(s) or microprocessor(s) as needed.

The controller 110 may communicate with another node via a first encrypted communication port 122 with the communication secured by a first security engine 121. The controller 110 may also communicate with still another node via a second encrypted communications port 132 with the communication secured by a second security engine 131. The encrypted communication ports may provide communications in various manners. For example, in an automotive application, one port may use the controller area network (CAN) standard for communication within the vehicle and another port may use a wireless standard for communication outside the vehicle. The security engines may protect the communications using organically derived synchronized processes.

The components of the node 100 of FIG. 1 may share some hardware. For example, the controller 110, the first security engine 121, and the second security engine 131 may use a common processor. Additionally, the communication node may be referred to as an endpoint. In embodiments, the functions of the functional blocks, components, or elements described above in connection with the node 100 can be implemented in hardware, firmware, software, or a combination of the three. In some examples, the communication node 100 may be a vehicle gateway device, used to organize and manage communication traffic within a vehicle (e.g., the sensors 141, 142) and between a vehicle and other communication endpoints. In one example, the node 100 could be an engine control unit (ECU) regulating fuel and air metering based on oxygen content from a sensor (e.g., the sensors 141, 142) in the exhaust gas. In another example, the node 100 can be a part of an anti-lock braking system (ABS) regulating caliper pressure based on brake pedal pressure (e.g., the sensor 141) in the cockpit and torque on the axle (e.g., the sensor 142). The node 100 can thus be an endpoint performing one or more of the exemplary functions.

Figure 2:
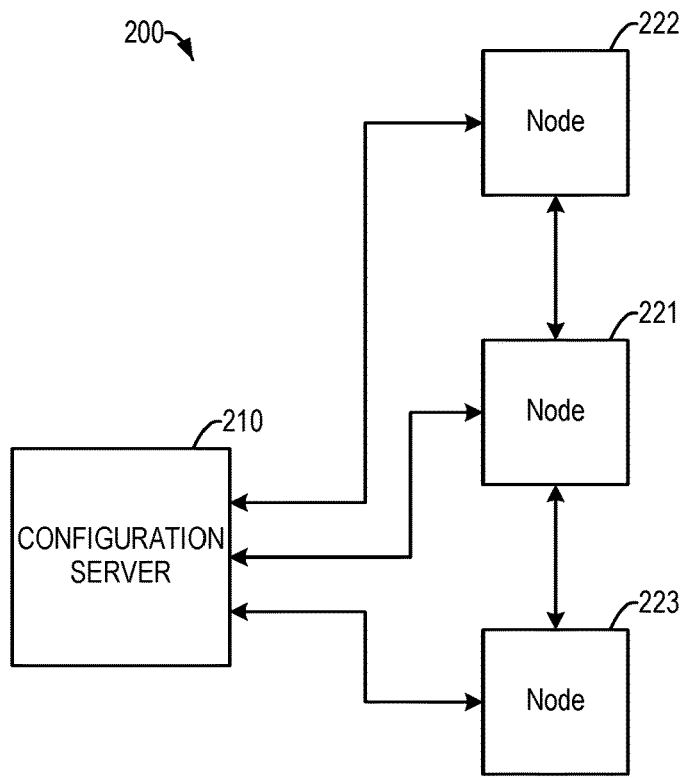
FIG. 2 functional block diagram of a communication system of FIG. 1.

FIG. 2 is a functional block diagram of a communication system of FIG. 1. A communication system (system) 200 includes a first node 221, a second node 222, and a third node 223. Each of the nodes may be the node 100 of FIG. 1. The first node 221 communicates with the second node 222 via a first point-to-point communication link and with the third node 223 via a second point-to-point communication link. In other systems, the nodes may use different communications links, for example, they may be connected in a mesh or mesh network.

The system also includes a configuration server 210. The configuration server 210 may be one server or a combination of servers including hierarchically arranged servers and proxies. The configuration server 210 may communicate with the nodes via dedicated communication ports. The configuration server 210 may supply configuration information to the nodes. For example, the configuration server 210 may provision the nodes 222, 221, 223 with initial seed values used to encrypt communications between or among the nodes. Provisioning can be performed locally or remotely. The provisioning prepares the nodes for secure communication. The configuration server 210 may also be used to resynchronize seed values, for example, in the event of a loss of synchronization, to monitor link status, and key revocation. Resynchronization of values may occur periodically or be event- or condition-driven. Some servers may have designated uses, such as, a master factory configuration server, a factory (non-master) configuration server, a field factory configuration server, and a field (non-master) configuration server. For example, the server function can be performed by more than one server at different times or cooperatively, and at more than one point in a lifecycle of the node (e.g., the node 100). In some embodiments, a factory can be a location where the node is provisioned or where there is otherwise physical and logical "trust" between the server and the node being provisioned or programmed. In some embodiments, a field is an actual operating environment (e.g., "in the wild") where there may be bad actors and/or threats to secure communication between nodes. Field servers may have specifically tailored mechanisms or programs to allow interoperability and secure communications using the SDSs.

In one example, the system 200 can comprise various system components of a vehicle. The first node 221, the second node 222, and the third node 223 can be implemented as various vehicle systems, such as antilock brakes, environmental controls, engine control functions, to provide but a few examples.

In another example, the system 200 can describe one of a plurality of subsystems within a vehicle. Thus, using the previous example, the system 200 can be implemented as an antilock braking system. In such an implementation, the first node 221 can be implemented in the cockpit of the vehicle to provide the system 200 with information related to brake pressure applied by a driver. The second node 222 can be, for example, a torque sensor in the drive train providing information related to torque applied by the engine to a wheel. Continuing with the same example, the third node 223 can, for example, be associated with a brake caliper and/or piston that can adjust the amount of braking pressure applied to the wheel based on brake pedal pressure and torque on the axle.

The preceding is provided by way of example, and not limitation. The system 200 can be implemented within any system requiring secure communication between one or more endpoints of a system.

Figure 3:
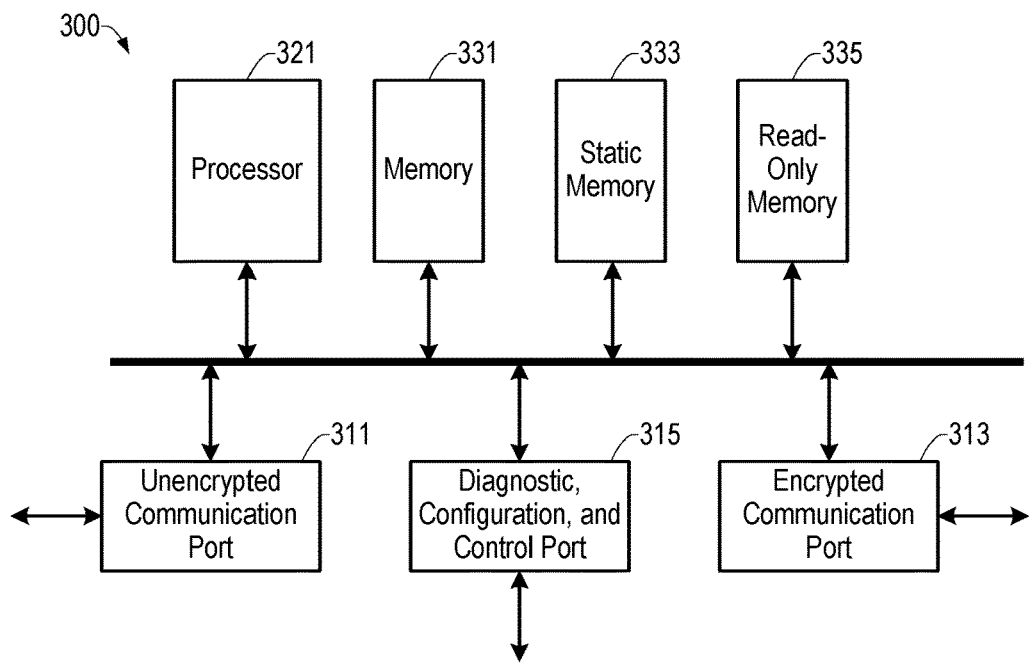
FIG. 3 is a functional block diagram of the security engine of FIG. 1.

FIG. 3 is a functional block diagram of an embodiment of the security engine 121 of FIG. 1. The security engine 300 may implement the first security engine 121 and the second security engine 131 of the communication node 100 of FIG. 1. Although the security engine of FIG. 3 may be used in many different systems, to provide a specific example, aspects of the security engine of FIG. 3 will be described with reference to the first security engine 121 of the node of FIG. 1.

The security engine includes an unencrypted communication port 311 and an encrypted communication port 313. The unencrypted communication port 311 carries unprotected communications. The unencrypted communication port 311 may, for example, connect the first security engine 121 to the controller 110. The encrypted communication port 313 carries protected communications. The encrypted communication port 313 can connect the security engine to another security engine.

The security engine also includes a diagnostic, configuration, and control port 315. The diagnostic, configuration, and control port 315 can provide communications with a configuration server.

A processor 321 can perform processing functions for the security engine 300. For ease of description, the processor 321 is used herein as the primary example. However, such processing functions can be performed by the processor 321 or in cooperation with other components, such as the processor 112. The processor 112 may further perform relevant processes for the security engine 300 independently. The processing can include, for example, encryption of communications from the unencrypted communication port 311 to the encrypted communication port 313, decryption of communications from the encrypted communication port 313 to unencrypted communication port 311, and management of the security processing. The processor is coupled to the unencrypted communication port 311, the encrypted communication port 313, and the diagnostic, configuration, and control port 315 as a sink and source of the corresponding communications.

The security engine of FIG. 3 includes three storage modules, or memories, coupled to the processor 321. A memory 331 can provide working memory storing, for example, input data, output data, and intermediate data. The memory 331 may be random-access memory. A read-only memory 335 can provide permanent storage of values that do not change during operation of the security engine. For example, the read-only memory 335 may store program instructions. A static memory 333 can store information that are static in the sense of being saved when the security engine is powered off but which can change during operation of the security engine. For example, the security engine may store parameters that the security engine uses to encrypt communications. The static memory 333 may be implemented, for example, with FLASH memory. Although FIG. 3 illustrates there separate memories 331, 333, 335, other storage modules, or other embodiments may use different types and combinations of storage. Similarly, the memories 331, 333, 335 can cooperate with or be combined with, for example, the memory 114 (FIG. 1).

Some features of the security engine may be stored in tamperproof hardware module. The module may contain, for example, seed values and other configuration information. In an embodiment, the tamperproof hardware module can only be accessed via a security engine's diagnostic, configuration, and control port.

In embodiments, the functions of the functional blocks, components, or elements described above in connection with the security engine 300 can be implemented in hardware, firmware, software, or a combination of the three.

Figure 4:
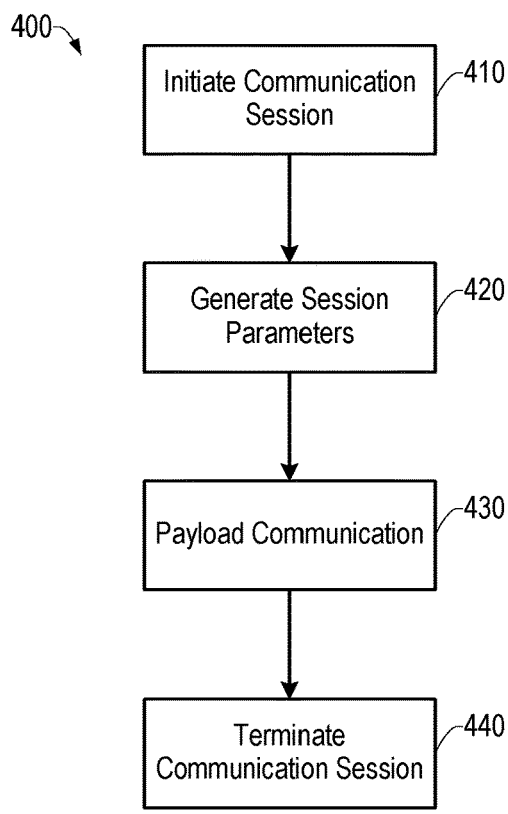
FIG. 4 is a flowchart of a process for secure communications.

FIG. 4 is a flowchart of a process for secure communications. To provide a specific example, aspects of a process 400 will be described with reference to the communication node 100 of FIG. 1, the communication system 200 of FIG. 2, and the security engine 300 of FIG. 3; however, the process may be used with any suitable apparatus. Each of the steps or blocks of the process 400, and the other processes or methods disclosed herein, may be performed by the controller 110 (FIG. 1) or one or more processors, such as the processor 321 (FIG. 3), for example. The controller 110 and the processor 321 can also perform the method steps or blocks cooperatively, as needed. However, for ease of description, the functions associated with the steps or blocks may be described in terms of various nodes (e.g., the nodes 221, 222, 223), when their respective controllers or processors are actually performing the various functions.

In block 410, the node 100 can initiate a secure communication session. For example, the first node 221 may initiate the session by sending a start frame to the second node 222. Initiation of a session (and other management and maintenance functions) may use a guaranteed delivery protocol such as a connection oriented protocol, for example, transmission control protocol (TCP). A node that initiates a session may be considered the "managing node" for that session. The start frame may be encrypted, for example, using initial parameters or parameters from a prior session. The start frame may also be referred to as a session establishment frame.

In block 420, the process 400 can include generation of parameters used to secure the communications for the secure communication session. For example, to generate secure communication parameters, the first node 221 may combine a seed value stored at the first node 221 with random data to produce some contents of the start frame and generate the parameters used to secure the communications from the seed value and the random data. The random data forms a parameter data set. The size of the parameter data set may be dynamic. The second node 222 may generate parameters it uses to secure the communications from a seed value stored at the second node and data from the start frame. During normal operation, the seed value stored at the first node and the seed value stored at the second node are equal and the generated parameter will match. The parameters may be generated using a multifactor approach and can be used for symmetric key encryption. Other management frames may be similarly encrypted.

In block 430, the process 400 can include communication of encrypted payload data. For example, the first node 221 may send payload frames to the second node 222, and the second node 222 may send payload frames to the first node 221. The payload data is protected using the parameters generated in block 420. The encrypted payload data may be communicated using a low-overhead protocol, for example, user datagram protocol (UDP). The payload data is information that the nodes communicate to perform their system functions. The start frame may also include encrypted payload data. The payload data may also be referred to as user data. Payload data or user data can be, for example, information to be transmitted via the unencrypted communication port 311 for the purpose of being encrypted. This can include, for example, data generated by a smartphone application or browser response or instruction.

In block 440, the one of the nodes (e.g., the first node 221, the second node 222) can terminate the secure communication session initiated in block 410. For example, if the transmission control protocol (TCP) was used to send the start frame initiating the secure communication session, terminating the TCP session can be used to terminate the secure communication session. The session may be terminated explicitly by a communication from one of the relevant nodes, or implicitly, for example, by a session timeout. A session may also terminate due to unsuccessful communication.

The process 400 of FIG. 4 may be modified by adding, omitting, or altering steps. Some steps of the process may be reordered or executed concurrently.

Figure 5:
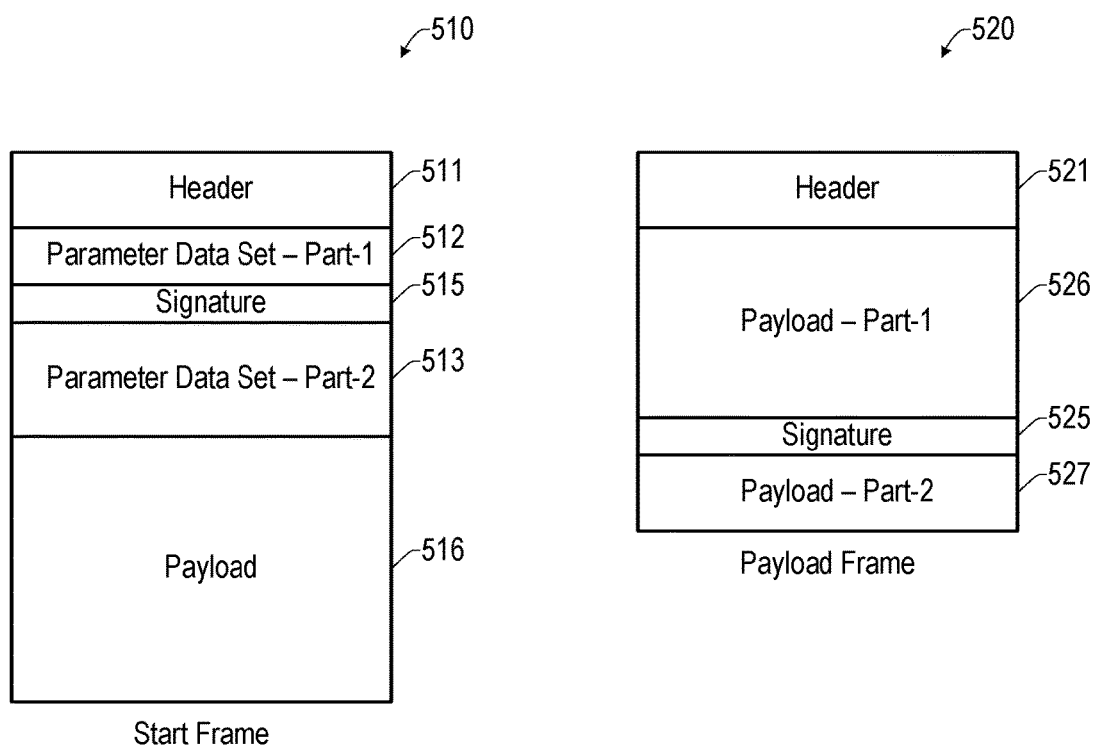
FIG. 5 is a graphical depiction of exemplary frame formats used in the secure communication method of FIG. 4.

FIG. 5 is a graphical depiction of exemplary frame formats used in the secure communication method of FIG. 4. A start frame format 510 can be used to send the start frame of block 410. The start frame format 510 includes a header 511. The header 511 may include information identifying the frame as a start frame, identifying the source and destination of the frame, and the length of the frame.

The start frame format 510 includes a parameter data set (block 420) that may be split into a first part 512 and a second part 513 that are located at two locations in the frame. A signature 515 is located between the first part 512 and the second part 513 of the parameter data set. In some embodiments, the signature 515 may be created for a start frame or a payload frame by calculating a cyclic redundancy check of the unencrypted user data. In some other embodiments, the signature 515 may be a cyclic redundancy check of the parameter data set. Alternatively, the signature 515 may be a cyclic redundancy check that covers, additionally or alternatively, one or more of other contents of the start frame, user data, or payload data 516. The locations of signatures may also be referred to as signature offsets. The signature may be, for example, thirty-two bits. Alternatively, signature 515 may be creating for a start frame or payload frame using a one-way cryptographic hash function such as SHA-3. The hash function may use the unencrypted user data (or a portion thereof) as an input. To verify the signature, each node receiving the start frame or payload frame, applies the one-way cryptographic hash function to the user data decrypted by the receiving node. The output of the hash function is then compared to signature 515. If they are equal, then the signature is said to be verified.

Alternatively, signature 515 may be created for a start frame or payload frame using a message authentication code (MAC) or hash based method authentication code (HMAC) function, such as HMAC-SHA256. The MAC function should not be confused with a MAC address as disclosed herein. The MAC or HMAC function may use the unencrypted user data (or a portion thereof), and a key or cipher key (described below) as inputs. The MAC or HMAC function can generate the signature 515. To verify the signature, each node receiving the start frame or payload frame applies the MAC or HMAC function to the user data decrypted by the receiving node, using the current cipher key derived by that node. The output of the MAC or HMAC function can then be compared to signature 515. If the received signature and the signature generated by the receiving node are equal, then the signature is said to be verified.

The start frame format 510 may also include payload data 516, which is protected using parameters derived from the parameter data set. The signature 515 may alternatively be located in or adjacent to the payload data 535. Both the contents and the location of the signature increase security of the frame. Verification of the signature by a receiving security engine may be viewed as zero-knowledge authentication.

A payload frame format 520 can be used to send the payload data of block 430. The payload frame format 520 includes a header 521. The header 521 of the payload frame format 520 may be the same or similar to the header 511 of the start frame format 510.

The payload frame format 520 includes payload data, which is protected using parameters derived from the parameter data set of a preceding start frame. The payload data may be split into a first part 526 and a second part 527 that are located at two locations in the frame. A signature 525 is located between the first part 526 and the second part 527 of the payload data. The signature 525 may be a cyclic redundancy check of the payload data.

Figure 6:
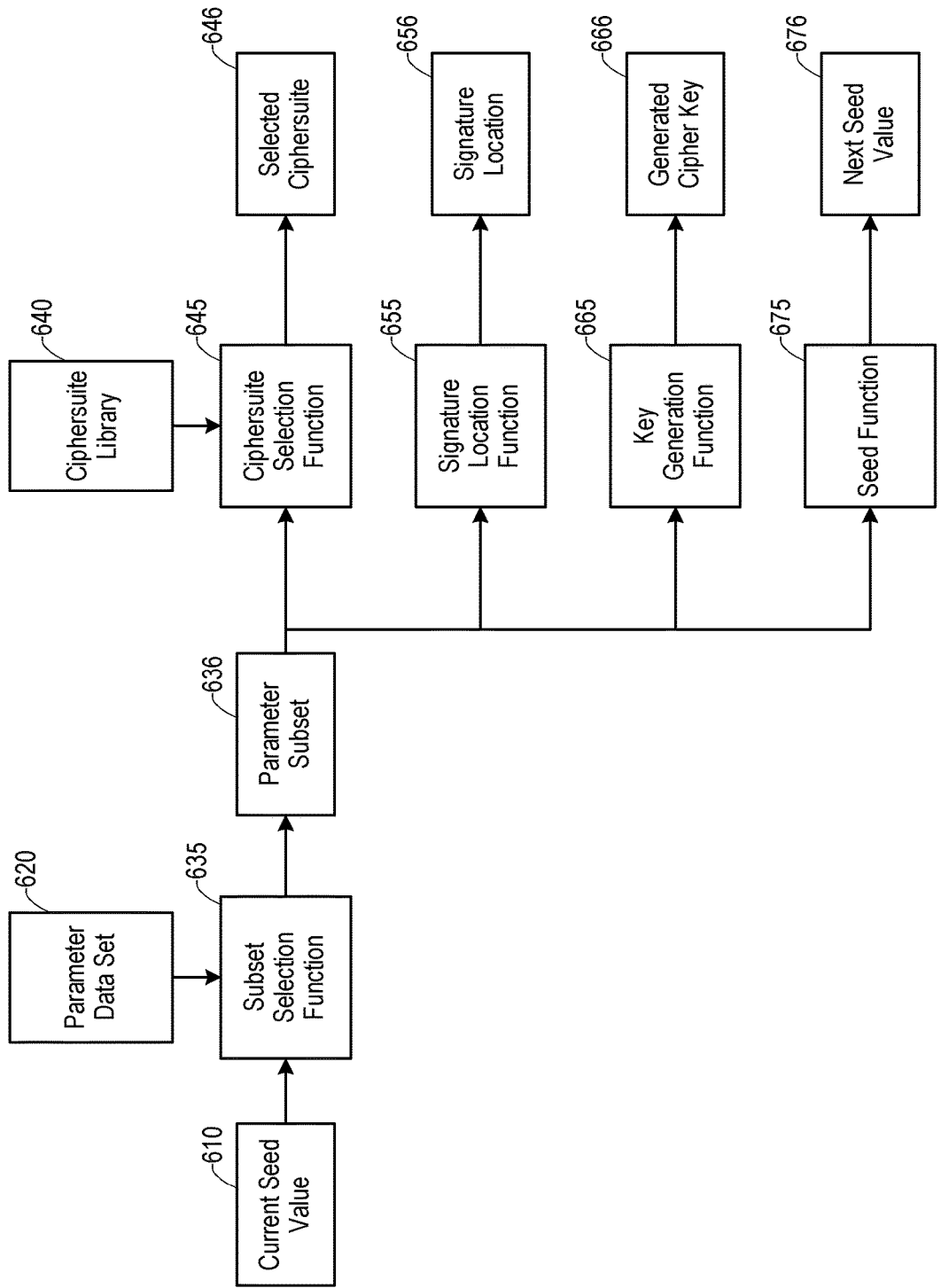
FIG. 6 is a flowchart of a process for generating parameters used for secure communications.

FIG. 6 is a diagrammatic representation of a process for generating parameters used for secure communications. A process 600 may be used to generate the parameters used to secure communications such as those generated in block 420 (FIG. 4). The process 600 can be performed by the controller 110, for example, at the nodes that engage in secure communication sessions (e.g., the first node 221, the second node 222, and the third node 223). The process 600 is described in relation to the controller 110 of the node 100, however as noted above the node 100 can be similar to the first node 221, the second node 222, and the third node 223, or the other nodes described in the following paragraphs. Thus, the process 600 can be performed by one or more nodes using the secure communication methods described herein. The process 600 can also be performed in whole or in part by the security engine 300. The process 600 can also be performed cooperatively between the processor 112 and the security engine 300 as required.

The process 600 can begin with a current seed value 610. The node 100 can use the current seed value 610 as a basis for the following secure communication processes. The current seed value 610 may, for example, be a value from an initial configuration of the security engine 121 or a next seed value 676 from a prior performance of the process 600. The current seed value 610 may, for example, 32 bits. The process 600 can also involve a parameter data set 620. The parameter data set 620 may, for example, be random values generated by the security engine 121 that initiates a communication session or values received in a start frame. Random values may be generated, for example, using a hardware true random number generator, physically unclonable device, or derived from a sensor measurement. The source of the random values can be immune from tampering.

The controller 110 can use the current seed value 610 and the parameter data set 620 to generate a selected ciphersuite 646, a signature location 656, and a cipher key 666 as parameters for secure communications. The controller 110 can also generate the next seed value 676 for use as the current seed value 610 in a subsequent performance of the process 600. The current seed value 610 may be updated at the end of a communication session.

The parameter data set 620 may be considered part of a synchronized data set denoting that synchronized values are stored in multiple nodes. Parameter data sets can be transmitted in the start frame format 510 so they may be common to two security engines (e.g., the security engines 121, 131) at the ends of a point-to-point link or common to a larger group of security engines 121, 131. A synchronized data set may include all or any of the information (including the parameters or values used to generate the parameters) used to communicate data or for link management. The node 100 (e.g., the first node 221, the second node 222, and the third node 223) may maintain a table of data sets, for example, a data set for each communication link associated with the node 100. The node 100 may also maintain one or more data sets (e.g., an SDS) for provisioning, for example, a data set for factory provisioning and a data set for field provisioning.

The controller 110 can use a subset selection function 635 to select one or more values from the parameter data set 620 to form a parameter subset 636. The subset selection function 635 can be implemented as one or more secure hash functions, for example. The controller 110 can also use the parameter subset 636 to generate other parameters, such as the cipher key, ciphersuite, next seed value, and signature location. Other parameters may be included. Selecting the parameter subset 636 may include multiple substeps. For example, the controller 110 may first determine a number of parameters to include in the parameter subset 636, determine a selection function to be used to select the parameters, and use the selected function to select the determined number of parameters. The parameter subset 636 may also be referred to as a parameter data set subset or PDS subset.

The controller 110 can use a ciphersuite selection function 645 to determine the selected ciphersuite 646 based on the parameter subset 636. The ciphersuite selection function 645 can be implemented as one or more secure hash functions, for example. The selected ciphersuite 646 may be one or a combination of cipher functions selected from a ciphersuite library 640. The selected ciphersuite 646 may be used to encrypt payload data.

The controller 110 can use a signature location function 655 to determine the signature location 656 based on the parameter subset 636. The signature location function 655 can be implemented as one or more secure hash functions, for example. The signature location 656 may determine locations of the signatures in start frames and payload frames. The signature location 656 may include a value for start frames and a separate value for payload frames.

The controller 110 can use a key generation function 665 to generate the generated cipher key 666 based on the parameter subset 636. The key generation function 665 can be implemented as one or more secure hash functions, for example. The generated cipher key 666 may be used with the selected ciphersuite 646 to encrypt payload data.

The controller 110 can use a seed function 675 to generate the next seed value 676 based on the parameter subset 636. The seed function 675 can be implemented as one or more secure hash functions, for example.

Similar to the subset selection function 635, the ciphersuite selection function 645, the signature location function 655, the signature location function 655, and the seed function 675 may include multiple substeps. For example, the substeps may be two or more cascaded hash functions. This can provide increased entropy in the resulting values. Additionally, some functions may use all or parts or the parameter subset 636 directly as their results.

The hash functions described in connection with the process 600 can be secure cryptographic hash functions, for example, producing an HMAC or CMAC. The input to such a hash function such as the parameter subset 636 for the ciphersuite selection function 645, the signature location function 655, the signature location function 655, and the seed function 675 can be used to generate the associated output. The secure hash function can be irreversible, thus preventing the reverse generation of the parameter subset 636 from the output of the hash function.

Using the process 600, the first node 221, the second node 222, and the third node 223, for example, can each generate the same or equivalent ciphersuite 646 and the same or equivalent cipher key 666 based on the SDS and current seed value 610 common to each node in the system 200. Equivalent in this sense refers to the independent calculation of these values at each end of the communication (e.g., at each of the communicating nodes). Even though the nodes independently calculate these values or numbers (e.g., not copied or transmitted), they are the same to the extent they produce a secure and encrypted link. This parity among the nodes allows secure communications using the ODSP processes disclosed herein.

The process 600 may be modified by adding, omitting, or altering steps. For example, in an implementation that uses a fixed ciphersuite, the ciphersuite selection function 645 may be omitted. Some steps of the process may be reordered or executed concurrently. Additionally, some functions may depend on the results of other functions. For example, the key generation function 665 may operate differently depending on the selected ciphersuite 646.

In some embodiments, the configuration server 210, for example, can issue one or more commands to one or more communicating nodes 100. Multiple commands may be used to configure and manage the secure nodes 100 and their respective security engine 121. Such commands can further manage operations of the controller 110, and the node 100 more generally, in various states, both during configuration and during functional operation. Some configuration states may be used when the configuration server 210 communicates with the node 100 (e.g., the first node 221, the second node 222, and the third node 223) via a diagnostic, configuration, and control port.

The following is a description of some exemplary commands that can be issued by the configuration server 210. The node 100 may operate in an offline state or an online state with corresponding commands used to switch the node 100 into and/or out of those states. Similarly, individual links (e.g., in the node 100 having multiple security engines 121, 131) may be switch to online or offline states with corresponding commands. The online and offline commands may be communicated between nodes 100 on a link (e.g., the first node 221, the second node 222, and the third node 223). The offline state may be the default state into which a node begins operation.

A port manual reset command can be used to place a node into an offline state (if it was not already offline) and then reprogram the node with parameter values that may be specified within the command.

A create security link association command can be used to add associations (also referred to as security link group) a between two or more nodes 100. A create security link command can be used to add a node to a security link group, such as that described in connection with FIG. 7. Similarly, a delete security link command can used to remove a node from a security link group. When a final node (or penultimate node) is removed for a security link group, the group itself may also be removed.

A security link reset command can reset a node over a secure link. A test security link command can be used to diagnose a link. The command may initiate one or a sequence of tests to check and validate the status and integrity of a security link or security link group.

Although the above commands are described as being issued by the configuration server 210 (FIG. 2), similar commands may be issued in a node-to-node manner, such as from the first node 221 to the third node 223. Such commands can be triggered by the first node 221 receiving a command from the configuration server 210, for example.

Link reset commands can be used when reset of an existing security link is desired. Examples of when reset may be desired include: when the link encountered an unrecoverable synchronization issue (this condition should be exceptionally rare); when a node that is part of an existing security link is being replaced (such a reset may be done manually or via a semi-autonomous method); and based on a system management decision to reset, for example, based upon an issue or a concern (e.g., detection of a security leak). Such a reset may be periodic.

Nodes may need resynchronization since the security engines 121, 131 rely on synchronization of parameters (e.g., seed values and parameter data sets). The system 200, for example, may use one or more resynchronization method in the event that synchronization is lost. Resynchronization may be immediate and event driven, for example, following a loss of synchronization detection by one or more of the nodes 221, 222, 223. Resynchronization may also be a timeout based re-sync, for example, in the event that an immediate re-sync fails and a time threshold (e.g., 30 seconds) has been exceeded since a last successful communication. Additionally, a semi-permanent disabled mode may be employed if resynchronization fails. A semi-permanent disabled mode may be recovered via the configuration server 210.

Resynchronization may include multiple management frames communicated between nodes. A fallback resynchronization start frame is a first step in a three-way handshake for reestablishing synchronization of a security link. The fallback resynchronization start frame may be transmitted in response to an incoming frame when receiving security engine cannot decrypt the incoming frame using its decryption parameters. The decryption parameters may be parameters used for start frames and payload frames, parameters used for management frames, or parameters specific to resynchronization frames. The fallback resynchronization start frame is send from the node that was unable to decrypt an incoming frame to the node that transmitted that frame.

A fallback resynchronization response frame is a second step in the three-way handshake for reestablishing synchronization. The fallback resynchronization response frame is transmitted in response to a fallback resynchronization start frame.

A fallback resynchronization complete frame is a third step in the three-way handshake for reestablishing synchronization. The fallback resynchronization complete frame is transmitted in response to a fallback resynchronization response frame.

The frame format for each of the above resynchronization frame may be based on session seed values, for example, determined using a hash function.

A failsafe resynchronization process may be use dedicated parameters (e.g., ciphersuite and cipher key) to resynchronize a link. This process may be used, for example, when a session has not occurred on a link with a failsafe time period. Then, when an attempt is next made to start establish a secure communication session, the nodes 100 in the of the security link group will utilize the dedicated parameters to communicate.

The above descriptions describe details of systems where nodes are provisioned or programmed by the configuration server 210 (also referred to as diagnostic configuration device) via a connection to each node 221, 222, 223. The provisioned parameter data sets can provide secure communication paths between two communication nodes 100. The parameter data sets were provisioned on each node 100 prior to its operation of secure communication.

The diagnostic configuration device (e.g., the configuration server 210) may be a physical device that is directly connected to a node via a wired or wireless network connection. The diagnostic configuration device may also be indirectly connected to a node 100 via a network such as an Ethernet network, a Wi-Fi network, or a network comprising multiple communication technologies.

The provisioning of the node 100 across an indirect connection may require the traversal of data across a network of one or more intermediate networking components such as switches, routers, gateways or firewalls, thus allowing the connection to take place at an arbitrary distance. An indirect connection may include the traversal of data across both private and public networks.

The diagnostic configuration device may be a logical entity that is part of a larger physical entity. For example, the diagnostic configuration device may be an application executing on a server or computer that may host one or more functions in addition to diagnostic configuration device related functions. The diagnostic configuration device logical entity may operate within a virtual machine or container. The diagnostic configuration device as a logical entity may be connected to a communication node either directly or indirectly, as described above.

In each of the above exemplary diagnostic configuration device connection scenarios, the communication between the diagnostic configuration device and the network node can be secured using the systems and methods disclosed herein, for example.

In some scenarios, the diagnostic configuration device and communication nodes to be provisioned may be located in a physically secure environment (e.g., a network in an access-controlled factory environment). In such a case, the connection between diagnostic configuration device and communication node may not need itself to be logically secured. The physical security of the communication between diagnostic configuration device and communication node may provide sufficient security.

However, there are other scenarios in which it may be beneficial to secure the connection between the diagnostic configuration device and each communication node during provisioning. Accordingly, the diagnostic configuration device connection may use a public key infrastructure (PKI) technique to secure the diagnostic configuration device connection. In such a scenario, a security certificate, signed by a certificate authority (CA) may be used to communicate a public key from the diagnostic configuration device to the communication node. The certificate may be validated by the communication node (e.g., the node 100) in order to authenticate the diagnostic configuration device. The diagnostic configuration device public key may then be used by the communication node to send information back to the diagnostic configuration device in order to establish a two-way, symmetrically encrypted communication between the diagnostic configuration device and communication node, for the purposes of provisioning. This PKI security technique may be used only once, to perform initial provisioning of the node 100, after which ODSP security is used to communicate securely between communicate nodes (e.g., the first node 221, the second node 222, and the third node 223), or between communication nodes and a diagnostic configuration device. Alternatively, PKI may be used as a fallback technique to resynchronize nodes. For example, if two nodes are unable to resynchronize (and thus establish secure communication) using the synchronization methods described above, a PKI session may be established between each communication node and a diagnostic configuration device to re-initialize one or more parameters.

There are many variants of PKI systems that may be used or configured to establish a secure communication link for use in the scenarios described above in connection with FIG. 1 through FIG. 6. This may include options for authenticating certificates, using differing key or cipher key lengths, and using different ciphersuites. Security protocols besides PKI may also be used for the securing of a diagnostic configuration device connection and for fallback purposes.

Having described systems and methods for secure communications, further aspects of example implementations are now described to aid in further understanding these systems and methods.

A first example system may apply to home and building automation. Example requirements for and characteristics of such a system follow. The size of the parameter data set (PDS) may be between 64 and 512 bytes. The signature is four bytes. The signature is a cyclic redundancy check (CRC) of the entire frame payload, including the signature itself. The signature for a start frame is located with the parameter data set. The locations of the signature are regenerated every session. The signature locations are different between the start frame and the payload frames. The payload data (BEP) is up to 16,384 (16 k) bytes.

The following example illustrates different calculations for two sessions, AB and AB'. AB represents the first session's signature (proof value) offset function seed value. AB' represents the second session's signature (proof value) offset function seed value. Thus, using the below functions:

$f_{SEF}(AB, L1)$ computes the signature offset within the current session's start frame, for a given length, L1, of the encrypted (non-header) portion of the start frame (where L1=sizeof(PDS)+sizeof(CRC)+sizeof(BEP)); and $f_{BEP}(AB, L2)$ computes the signature offset within the payload portion of a payload frame within the current session, with a given length, L2, of the payload.

and $f_{SEF}(AB', L3)$ computes the signature offset within the current session's start frame, for a given length, L3, of the encrypted (non-header) portion of the start frame (where L3=sizeof(PDS)+sizeof(CRC)+sizeof(BEP)).

And, $f_{BEP}(AB', L4)$ computes the signature offset within the payload portion of a payload frame within the current session, with a given length, L4, of the payload.

Each node within the security link group uses synchronized seed values to generate a hash value. The below set of equations provides an overview of this process:

Let $AB_{CSSV}$ represent the current session starting seed value (also referred to as the current seed value).

Let $AB_{PDSSubsetSize}$ represent the next session PDS subset size.

Then:

$AB_{PDSSubsetSize} = f_{PDSSubsetSize}(AB_{CSSV})$ calculates the PDS subset size.

The current session seed value and the PDS subset size derived above can be used to select the parameter subset from the parameter data set. The below equations demonstrate this relationship:

Let PDS represent the parameter data set.

Let $AB_{CSSV}$ represent the current session starting seed value.

Let $AB_{PDSSubsetSize}$ represent the PDS subset size.

Let $AB_{PDSSubset}$ represent the PDS subset.

Then:
   $AB_{PDSSubset} = f_{PDSSubset}(PDS, AB_{CSSV}, AB_{PDSSubsetSize})$ selects the PDS subset.

The selected parameters derived as described above may be used for deriving decisions and generating values such as keys, updated seeds, and other related values. The selected parameters may be used for multiple derived decisions and generation of multiple values. New hash values and parameter subsets may be derived for each individual derived decision or value created. Thus, the actions described may be repeated for each individual derived decision and value created.

The system may use AES128 as a default ciphersuite and may use cipher block chaining.

The next session's cipher key may be computed using the parameter subset selected as described above. The below equations illustrate this relationship:
   Let $AB_{PDSSubset}$ represent the PDS subset.
   Let $AB_{CipherKey}$ represent the next session's cipher key.
Then:
   $AB_{CipherKey} = f_{CipherKey}(AB_{PDSSubset})$ creates the next session's cipher key.

The next session's starting seed value may be computed using the parameter subset selected as described above. The below equations illustrate this relationship:
   Let $AB_{PDSSubset}$ represent the PDS subset.
   Let $AB_{StartingSeed}$ represent the next session's starting seed value.
Then:
   $AB_{StartingSeed} = f_{StartingSeed}(AB_{PDSSubset})$ creates the next session's starting seed value.

The starting seed value is the core value used during the subsequent session to determine the number of elements to be used for the PDS subset, which values within the PDS subset to be used, and, the order of the PDS subset values.

The next session's signature offset function seed may be computed using the PDS subset selected as described above. The below equations illustrate this relationship:
   Let $AB_{PDSSubset}$ represent the PDS subset.
   Let $AB_{ZKA-OffsetSeed}$ represent the next session's signature function offset seed.
Then:
   $AB_{ZKA-OffsetSeed} = f_{ZKA-OffsetSeed}(AB_{PDSSubset})$ creates the next session's signature offset function seed.

The session signature proof value offset function seed is used as input to the function that calculates the relative offset within the encrypted payload of a frame.

The signature offset is calculated as a function of the signature value offset seed and the BEP length of the current frame. The below equations illustrate this relationship:
   Let $BEP_{Length}$ represent the length of the BEP within the current frame.
   Let $AB_{ZKA-OffsetSeed}$ represent the current session's signature function offset seed.
Then:
   $ZKA_{Offset} = f_{ZKA-Offset}(AB_{ZKA-OffsetSeed}, BEP_{Length})$ calculates the signature proof value offset for BEP within the current frame.

The system includes "keep-alive" frames transmitted that may during idle period. A keep-alive frame seed may be computed using the PDS subset selected as described above. The below equations illustrate this relationship:
   Let $AB_{PDSSubset}$ represent the PDS subset.
   Let $AB_{KeepAliveFrameSeed}$ represent the next session's keep-alive frame seed.

Then:
   $AB_{KeepAliveFrameSeed} = f_{KeepAliveFrameSeed}(AB_{PDSSubset})$ creates the next session's keep-alive frame seed.

The session keep-alive frame seed is used as input to the function that creates a unique session specific keep-alive frame.

The length of the payload within the keep-alive frame is derived from the current session's keep-alive seed and a random value within the originating node. The below equations illustrate this relationship:
   Let $AB_{KeepAliveFrameSeed}$ represent the next session's "Keep-Alive" Frame Seed.
   Let $CurFrame_{RandomValue}$ represent a random value generated for calculating the keep alive frame's BEP length.
   Let $BEP_{Length}$ represent the length of the BEP within the current frame.
Then:
   $BEP_{Length} = f_{KA-BEP-length}(AB_{KeepAliveSeed}, CurFrame_{RandomValue})$ calculates the length of the BEP portion for the current "Keep Alive" frame.

The node receiving the keep-alive frame uses the length found within the keep-alive frame for use as the $BEP_{Length}$ when calculating whether or not the keep-alive data within the received frame is accurate.

Data content within a keep-alive frame is derived from the current session's keep-alive seed and the length of the payload within the keep-alive frame. The below equations illustrate this relationship:
   Let $BEP_{Length}$ represent the length of the BEP within the current frame.
   Let $AB_{KeepAliveSeed}$ represent the current session's "Keep-Alive" data seed.
   Let $KeepAlive_{FrameData}$ represent the data within the current "Keep-Alive" frame.
Then:
   $KeepAlive_{FrameData} = f_{FrameData}(AB_{KeepAliveSeed}, BEP_{Length})$ calculates the data within the BEP portion of the current "Keep Alive" frame.

Multi-Member Security Groups

Figures 7, 8:
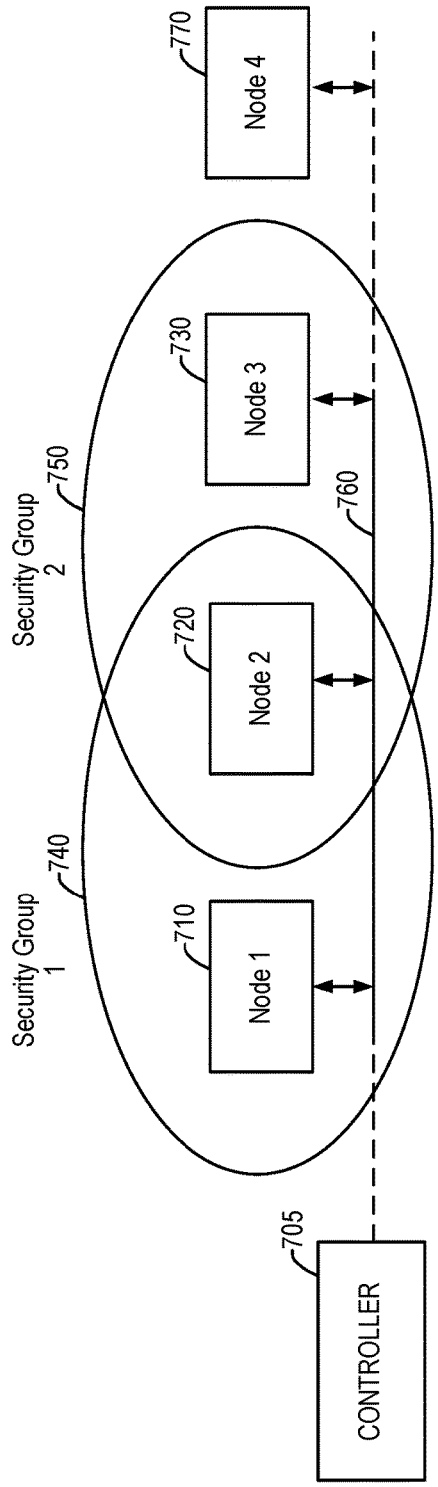
FIG. 7 is a functional block diagram of a security group.
FIG. 8 is a table describing exemplary node roles and permissions in an embodiment of the security groups of FIG. 7.

FIG. 7 is a functional block diagram of a security group. A communication system (system) 700 has two exemplary security groups, a first security group 740 and a second security group 750. Of course, more nodes and more security groups than those shown can be included in the system 700. In general, a security group can be a set of two or more nodes 100 that can securely communicate using the above described processes. The first security group 740 includes a first node 710 and a second node 720. The second security group 750 can have the second node 2 720 and a third node 730. A fourth node 770 is not associated with and is not a member of the first security group 740 or the second security group 750. The nodes 710, 710, 730, 770 can each have the characteristics and features of the node 100 (FIG. 1), or as described in the foregoing description.

As noted above, the parameter data set (e.g., the parameter data set 620), can be considered a part of a Synchronized Data Set (SDS). As used herein, SDSs are the set of synchronized values stored in each node 100 necessary to allow secure communication between nodes, for example (e.g., within the systems 200, 700). Thus during normal operation (e.g., operation which allows for secure communication between nodes of a security group), the SDS is "synchronized" (e.g., the same) across the nodes in communication with one another. Thus, the addition or removal of an SDS from a given node can determine which nodes are associated with which of the security groups. In some embodiments, the PDS and the SDS may be separated and treated as distinct pieces of information. Since the PDS can be transmitted in the start frame format 510, it will be known by each node 100, and in some cases may be considered part of the SDS. However, in embodiments where the SDS is transmitted/received/deleted or the SDS table is modified within a given node, the PDS is not considered part of the SDS.

In some embodiments, the SDS can include one or more seed values. For example, the SDS can include a start seed and a fall-back seed. The start seed (or start seed value) can be a primary seed used for ODSP communications within the security group. The fall-back seed (or fall-back seed value) can be used in the event the start seed is corrupt at one node within the security group or other need exists for resynchronization within the security group. The SDS can also include a listing of the identity of current security group members, for example. Thus, in order to add the fourth node to the second security group, for example, the fourth node 770 would need to receive at least the seed value used for communication within the second security group 750, and the member IDs of the security group members including memberIDs for the second node 720, the third node 730, and the fourth node 770.

In some examples, the SDS can include other data, such as the parameter data set 620. In some examples, however, since the PDS may be transmitted in the start frame format 510 (FIG. 5) the PDS may already be common to the members of a security group.

In some examples, the SDS can also include, for example, a resynchronization seed value, a resynchronization fallback timer value, a session cipher key, key rotation frequency, the number of nodes in a security group, security group ID, and the one or more parameters used to identify each of the other nodes in the security group such as group member ID, group member internet protocol (IP) or medium access code (MAC) addresses. An SDS may further include a role parameter (e.g. master or slave) which may be used to determine which node in a security group is required to generate and communicate the PDS in the start frame. The content of the SDS that is programmed, provisioned, or otherwise shared or withdrawn from a given node may vary based on specific makeup of the security group or level of abstraction, as described below. Thus, in some respects, a SDS can be a broader category of elements of data and information that allow the nodes to securely communicate. The SDS can be consistent from one node to the next within a given security group.

The nodes 710, 720, 730, 770 may store more than one SDS. Multiple SDSs may allow for secure communication with nodes in multiple security groups (e.g., the second node 720 being a member of the first security group 740 and the second security group 750). Each communication link between nodes can implement a different set of independent SDS security parameters. Multiple SDSs within a given node 100 may be stored in the memory 114. For example, the memory 114 can have a logical software table, such as follows:

| Index | Name | Security Parameters (exemplary) |
|---|---|---|
| 1 | Factory Provisioning | {initial seed value1, resync seed value1, fallback timer1, session cipher key1} + {groupID1, list of group memberIDs1} |
| 2 | Field Provisioning | {initial seed value2, resync seed value2, fallback timer2, session cipher key2} + {groupID2, list of group memberIDs2} |

-continued

| Index | Name | Security Parameters (exemplary) |
|---|---|---|
| 3 | Security Group 1 | {initial seed value3, resync seed value3, fallback timer3, session cipher key3} + {groupID3, list of group memberIDs3} |
| 4 | Security Group 2 | {initial seed value4, resync seed value4, fallback timer4, session cipher key4} + {groupID4, list of group memberIDs4} |

The sets of security parameters comprising a SDS at the nodes 710, 720, 730, 770, for example, may be formed in one or more categories such as provisioning SDS, and security group SDS.

In some embodiments, a provisioning SDS may be used to secure communication channels used to establish, configure, modify, or remove other SDSs such as one or more security group SDSs. A provisioning SDS may be used, for example, for secure communication between configuration server 210 and the nodes 221, 222 or 223 (FIG. 2). Since provisioning may be performed by various authorized other nodes (e.g., a central or certificate authority), and at different times during the lifecycle of a security relationship, multiple provisioning SDSs may be programmed into a given node 100 and stored within the memory 114. For example, a separate SDS may be used to secure communication during factory provisioning, field provisioning, or provisioning at an authorized service center.

If the security group (e.g., the first security group 740) consists of two nodes (e.g., the first node 710 and the second node 720), the security group enables secure, bidirectional communication between the two nodes. If the group consists of more than two nodes, the security group enables secure bidirectional communication between any two nodes within the group, using, for example, a unicast protocol such as UDP or TCP. Alternatively, secure communication between more than two nodes within a security group may use, for example, multi-cast or broadcast protocols such as Internet Protocol (IP) multicast or IP broadcast.

Secure communication between the first node 710 and the second node 720 of the first security group 740, for example, may be based on the use of a memberID, programmed in the SDS for the first security 740, and its associated network address (e.g., IP address). A memberID can be a number uniquely identifying a member of the security group. For example, a memberID can be a randomly generate number, a MAC address, a serial number, or other relevant set of digits that can uniquely identify a given node. In some embodiments, memberIDs may be repeated from security group to security group, however within a single security group (e.g., the first security group 740) the memberIDs of the member nodes can be unique.

A node 720, for example, may be simultaneously a member of both the first security group 740 and the second security group 750. The security groups may be used for the secure communication of user data, for the management and administration of a node (e.g. provisioning, revocation, reporting) or a combination of the two.

In FIG. 7, three the first node 710, the second node 720 and the third node 730 are able to communicate with each other within their respective first security group 740 and the second security group 750 using a communication medium 760. The fourth node 770 may be coupled to the communication medium 760, but is unable to communicate securely with the other nodes 710, 720, 730 because it is not equipped with the appropriate SDS, for example, and is therefore not associated with the first security group 740 or the second security group 750. Functions of the nodes 710, 720, 730, and 770 may be performed by hardware similar to that described in connection with the foregoing figures, including the processor 321, memories 331, 333, 335 and ports 311, 313 and 315 (FIG. 3).

Communication medium 760 may be a wired or wireless communication link, for example. The communication medium 760 can further be an Ethernet network supporting a TCP/IP or UDP/IP protocol. Communication between nodes within the first security group 740 are secured using the SDS common to the nodes 710, 720 within the first security group 740 (e.g. in the table above). Accordingly, the third node 730 (e.g., in the second security group 750) will not be able to listen or communicate with the members of the first security group 740, without the SDS common to the first security group 740, or a separate communication link, for example. Thus, any attempt to listen, decrypt or influence the communication between the nodes within the first security group 740 will not be possible as nodes external to the security group (e.g. node 730 or the node 770) do not have the necessary SDS parameters to successfully encrypt or decrypt a message.

In some embodiments, configuration of the nodes 710, 720 and 730 may be performed by a controller 705. In this sense, configuration of the nodes 710, 720, for example can include transmission of one or more SDSs to the first node 710 and the second node 720. The controller 705 can be, for example, a trusted management or administrative server such as the configuration server 210 (FIG. 2) or a central authority. Communication between the nodes 710, 720 and 730 and the controller 705 may be secured using techniques described herein (e.g., using a provisioning SDS established between each node 710, 720, 730, 770 and the controller 705). In another embodiment, the SDS may be provided to the nodes 710, 720, 730, 770 via an alternate method of secure communication such as a direct physical connection via USB or microSD card in a secure environment, or the use of certificate-based public key infrastructure (PKI) via a central authority (e.g., certificate authority (CA)), or other appropriate communication mechanisms.

A new security group may be configured and then initialized by a trusted management entity or administration component. Such a management entity can include, for example, a provisioning server, a configuration server (e.g., the configuration server 210), a controller (e.g., the controller 705), a management node, an administration node, or other entity capable of performing initial SDS provisioning of relevant nodes. In some embodiments, such a management entity can be a remote system, on a server, in the cloud, or distributed across a plurality of servers. The management entity can be established in a hierarchy of multiple elements, providing fall-back systems and emergency backup operation in the event a single element of the hierarchy fails. In some embodiments, the management entity can be embodied within one of the communication nodes (e.g., the first node 710, the second node 720) that are part of a security group. Accordingly, in an embodiment, the nodes 710, 720, 730 can perform the task of administering or controlling which nodes receive SDSs for a given security group.

In an embodiment, the first node 710 may have a preexisting or trusted relationship with the controller 705. The controller 705 can then add a new security group by providing a new SDS to the first node 710. The first node 710 can then store the new SDS to memory or append it to a relevant SDS table. This can enable the first node 710 to enter the first security group 740, for example. Thus the first security group 740 may be initialized by providing the new SDS to the first node 710 and the second node 720. Such initialization can comprise setting an enable bit within the SDS table (e.g., memory) storing the SDS associated with the particular security group in each of the member nodes 710, 720 designated in the first security group 740.

The security groups may be modified while in use. For example, the controller 705 may remove one or more nodes from a given security group by disabling or removing the SDS entry corresponding to the security group, in the one or more nodes. For example, the controller 705 may include the fourth node 770 in the first security group 740 by providing an appropriate SDS to the fourth node 770. This can include modifying the SDS associated with first security group 740 in first node 710 and second node 720 authorizing secure communication with the fourth node 770 (e.g. by adding memberID of fourth node 770 to the SDS associated with the first security group).

In some embodiments, the controller 705 can remove, or command the removal of, for example, the second node 720 from the first security group 740. This can include multiple steps. First, the controller 705 (or, e.g., the configuration server 210) can transmit message to the second node 720 commanding it to either add, change, or delete information related to the security group 740 (e.g. the SDS parameters) stored within in the memory of the second node 720. The second node 720 can receive message and make the necessary modifications in memory.

In an embodiment, the security group management functions associated with the controller 705 or the configuration server 210 (FIG. 2) in the foregoing description may be also be performed by one or more of the nodes 710, 720 or 730. In a further embodiment, a node that is a member of more than one security group (e.g. node 720), may be configured to bridge messages between two or more security groups (e.g. messages from the first security group 740 may be bridged to the second security group 750).

Security Groups Abstractions

As previously described, security groups may be formed by grouping a set of two or more nodes (e.g., communication devices or the nodes of FIG. 1 and FIG. 7 and elsewhere herein). In some embodiments, the first security group 740 or the second security group 750 may be formed by grouping a set of logical or virtual nodes. A "virtual node" as used herein may refer to an entity that may not have a standalone physical structure. For example, a security group may be formed by grouping two or more virtual computers or virtual machines (e.g., Oracle VirtualBox) or operating system containers (e.g., Docker). In this sense, the security group may not be associated with a specific piece of hardware (e.g. device, physical communication port, mobile terminal, or similar).

In an embodiment, a security group (e.g., the first security group 740 or the second security group 750) may also be formed as a group of two or more user applications (e.g. smartphone "apps") which may communicate to each other securely. For example, a security group may be formed for a set of two or more instances of a communication application (e.g., WhatsApp application). This can be convenient for intra-business communication between employees, for example. In some embodiments, the SDS may reside with the individual application, meaning that if the application is moved from one mobile device to another (virtual or physical) node, the security profile "moves" with the application, and is not limited to use with only one device.

In some embodiments, the first security group 740 may be formed as a group of users which have a need to communicate with each other securely. For example, a security group may be formed for a college class between the teacher and her students. The security group will secure any and all communication between this group, regardless of device (e.g. smartphone vs laptop) or application (Whatsapp vs Facebook messenger).

In some embodiments, the first security group 740 may be a hybrid security group using more than one abstraction to define member nodes. That is, a hybrid security group may be formed by combining one or more physical nodes (e.g., a mobile device), virtual nodes, logical groups, applications, or users. For example, the first security group 740 used within a corporation may include corporation-issued devices assigned to users in a given division using at least one of a designated number of corporation-approved communication software applications, for use on the corporate issued devices. Multiple factors may be use to define which nodes can qualify as to be a member node of the security group 740, for example. Thus within the first security group 740 implemented as a hybrid security group, the first node 710 and the second node 720 may be corporate-issued devices operating on, for example, one of three approved applications. For hybrid security groups, an SDS may therefore expand the memberID to include identifiers for each aspect (e.g., the multi-factor) needed to define a member node of a security group. In the above example, the memberID for the first node 710 and the second node 720 can include an identifier for both the approved applications and the devices themselves. That is, the memberID may be expanded into, for example, a userID, nodeID, applicationID or logicalID to appropriately define the members of each hybrid security group based on an identity or entity type, and provide secure communications.

Roles and Permission Levels

FIG. 8 is a table describing exemplary node roles and permissions in an embodiment of the security groups of FIG. 7. The numbers and levels indicated in the table of FIG. 8 are exemplary and used only for illustration. Actual numbers may be the same or different than those shown. In some embodiments, certain members of a security group (e.g., nodes, users, applications, virtual machines, etc.) may take on one or more roles or may have one or more permissions within the security group. Each communication participant (e.g., the nodes 710, 720, 730) within a security group (e.g., the first security group 740 or the second security group 750) may be referred to as a member. For example, a member may be designated as a worker, in which security functions may be limited to sending and receiving secure communication. Another member may be designated as an administrator, for which security functions may further include adding new members to the security group, removing members from the security group, or changing permissions or roles of members in the security group.

The roles and permissions of members in a given security group (e.g., the first security group 740 and the second security group 750) may be granted by an initial provisioning by, for example, a configuration server 210 or the controller 705. Roles and permissions for associated nodes may be changed during operation, also by the configuration server 210 or the controller 705, for example.

Additionally, roles and permissions of the members may be earned and/or designated within a security group itself. In an embodiment, a member may have an enhanced role (e.g. administrator) or an increased level of permission (e.g. allowed to remove members of the security group) after that member has accumulated an amount of trust beyond a certain threshold, via a trust metric.

As shown in FIG. 8, multiple role and permission levels may be defined and established within a security group, each requiring a minimum, threshold amount of trust (e.g., the trust metric) that may be accumulated before a member may participate in security group communications at a particular trust level. A security group such as the first security group 740 may be initialized with each member configured to have a trust metric of, for example, 64 (worker), thus enabling level 2 operations as shown in FIG. 8 (e.g., the member allowed to send/receive communications). Over time, the first node 710 may accumulate an increased level of trust. If the trust metric is greater than or equal to 128, the particular node may perform the administrative function of adding new members to the security group. If for example, the first node 710 continues to accumulate trust, it may reach a trust metric of 196 in which it may be further capable of removing members from the first security group 740. In this example, a member having a trust metric at a certain level is permitted to perform the functions associated with that level and functions of all lower levels as shown in the table of FIG. 8.

As used herein, trust may be earned, and a trust metric increased, by a member conducting secure transactions for some period of time (e.g., a day, a month, a year) with no security anomalies such as a loss of synchronization, a resynchronization (or "resync") event or any evidence of a communication breach. In some examples, a member's trust metric may be increased only via query to one or more other members to eliminate the risk of a member "self-promoting" itself.

For example, periodically, the first node 710 may query the second node 720 (FIG. 7) to determine whether the first node 710 has qualified for an increase in its trust metric. The second node 720 may be able to approve or deny an increase in the trust metric of the first node 710, based on information it has collected regarding, for example, anomalies in communication with the first node 710. In a further embodiment, the response of the second node 720 may include a recommendation to increase, decrease, or maintain the trust metric of the first node 710. The magnitude and sign of change of the trust metric may be a function of the quantity, duration and/or severity of the security anomalies observed by the second node 720 in relation to communication with first node 710. The amount of change of the trust metric may be a function (e.g. mathematically normalized) of the amount of time elapsed or quantity of data transmitted since a prior query. The response to a query may be a recommendation (e.g., the second node 720 may recommend that the first node 710 be promoted from level 3 to level 4) which may or may not be accepted by the requesting party (e.g., the first node 710 may not be authorized, locally, to perform level 4 operation). Alternatively, the response to a query may force a required action (e.g. acceptance) by the requesting party. For example, the second node 720 may have observed numerous and severe security anomalies in communication with the first node 710 and may respond with a 128 point reduction of the trust metric following a query by the first node 710. The first node 710 may be required to adopt the new metric and operate at a lower level of permission.

A change in the trust metric of a member of the first security group 740 (e.g., for the first node 710) may be based upon a query to more than one other member in a security group. The change in trust may be based on a mathematical and/or logical combining of the results from the set of other members which have been queried. For example, an increase in the trust metric may require all of the following to occur:

a) All other members have been queried and have responded, b) All other members agree that the requesting member qualifies for an increase in trust c) The increase in the trust metric is the smallest increase recommended by the other members.

A decrease in the trust metric may be based on logic or mathematical combining different than that of an increase in a trust metric. For example, to be conservative, the trust metric of a node may be reduced if only one member recommends a reduction of the trust metric.

One skilled in the art would appreciate that the above methods describing the processes to increase and decrease a trust metric may use alternate methods, besides a query method, to communicate updates between members. For example, members may publish trust updates periodically or based upon events such as the detection of a security anomaly.

Remote/Distributed SDS Entries

As noted above, the node 100 is described in terms of hardware components. However in some embodiments, the functions of the functional blocks of the node 100 can also be implemented in software and/or firmware or otherwise implement cloud computing or other forms of distributed processing across a network. Thus the concept of a "node" can be abstracted and be implemented in one or more of hardware, firmware, and software. Thus, the SDS table for each member of a security group is stored at the node 100 (e.g., in the memory 114), whether the node 100 is a physical device, a virtual machine, or an application associated with the first security group 740 or the second security group 750. For example, the SDS table for a security group of WhatsApp applications may be stored by, and associated with the WhatsApp software executing on the smartphone or laptop previously authorized for use. In other words, the SDS can remain with the relevant node regardless of the node's implementation or construct.

Alternatively the SDS entries for each member of a security group may be stored in a physical or logical device that is separate from the security group member and its related communication node, virtual machine or application.

For example, the SDS table may be stored in a file, database or ledger hosted by the configuration server 210. SDS security parameters enabling secure communication with the configuration server 210 may be stored locally in the member/node device, thus allowing secure, remote access to SDS table entries which define membership for any additional security groups.

In a further embodiment, each member of security group may access its SDS table from a cloud database (e.g., MongoDB). SDS security parameters enabling secure communication to/from the cloud database may be stored locally in the node 100, such as a physical device (e.g., smartphone), a virtual machine, or an application and also in a cloud database server. This can allow remote access to SDS entries which define membership for any additional security groups.

Alternatively, secure communication between members and a cloud database may be secured using alternative methods, include the use of PKI. One skilled in the art would appreciate that storing SDS credentials in a cloud database may create a distributed set of SDS information, spread across multiple physical servers, multiple virtual machines, multiple logical database instances or across physical geography.

In yet a further embodiment, the SDS table for members of a security group may be stored in a secure, distributed ledger system such as a blockchain. Additions to a security group, changes to the role or permissions granted to a member, and member removal may all be recorded on and queried from such a secure, distributed ledger system such as Ethereum or Block Chain as a Service from Microsoft Azure. The blockchain itself may be secured by alternate means such as PKI or other forms of certificate based systems and protocols, e.g. transport layer security (TLS) protocol.

Synchronization

Two or more nodes 100 are said to be synchronized (or "in sync") when nodes are applying the same set of encryption parameters to communicate with each other (e.g. encryption/decryption cipher key, block size, cipher suite, digital signature location, etc.). In other words, two nodes are said to be synchronized when identical SDS are used for communication between them. When nodes are synchronized with each other, they can communicate securely with each other, including the successful verification of the digital signature field sent as part of a communication packet. As used herein, a "node" can be generally include a physical node, a virtual node, a logical node, user or an application, as needed. A physical node can be a user device such as a mobile phone or other electronic communication device. A virtual node can be, for example, an instantiation of an operating system, a program, or a virtual computer system, for example, executing the functions of the node 100 (FIG. 1) or the security engine 300 (FIG. 3). A node can further include system entities confined to certain layers within an open systems interconnection (OSI) model layer (e.g., MAC, PHY, application layer, etc.).

As described herein, nodes within a security group may fail to communicate successfully with each other for one of many reasons. For example, a node may fail to communicate with another due to packet loss or corruption in the presence of noise in the wireless communication medium. In this case, synchronization is not lost immediately, however, depending on the retransmission capabilities of the communications network, a loss of one or more packets may cause a loss of sync between nodes at some point in the future. This is due to the fact that future SDS parameters, for example a cipher key, may be calculated using packet data communicated between nodes. If one of the two nodes in a secure communication link does not properly receive all of the communication packets, the cipher keys calculated by the two nodes on either side of the communication link may be different. Hence, the nodes would then be out of sync.

Further a node may fall out of sync due to a reset of a node on one side of a communication link. In this example, a node may fail to receive all of the packets transmitted by another node, and like the previous example, may lose sync at a future time due to the pair (or group) of nodes failing to calculate the same, next or updated set of SDS parameters.

These causes of synchronization issues may be grouped in a class termed "operational causes".

Alternatively, a node may fall out of sync due to a class of causes which will be termed "threat causes" (or "threats"). These causes are due to one or more attempts to disrupt, modify, listen to, or prevent communication between nodes by a malicious entity ("hacker") wishing to do harm. For example, a hacker may desire to modify the content of a communication packet in order to cause harm to an operational system (e.g. prevent operation or modify its behavior in some way). By intercepting the packet, modifying it and then transmitting it, a so-called "man-in-the-middle" attack is created. In this case, the hacker does not have access to the current SDS values, thus cannot know how to modify the digital signature successfully. Thus, when the hacked packet is received, the digital signature (e.g., the signature 515 of FIG. 5) does not validate the authenticity of the packet sender. The packet will be rejected by the receiver. Depending on the retransmission policies of the communication system, a duplicate packet may be sent. However, depending on the nature and severity of the attack, the retry mechanism may not be capable of successfully communicating all packets to the receiving node. As with the examples prior, this can lead to a loss of sync due to a failure to create matching SDS parameter sets for nodes within a security group.

Anomaly Determination

Figure 9:
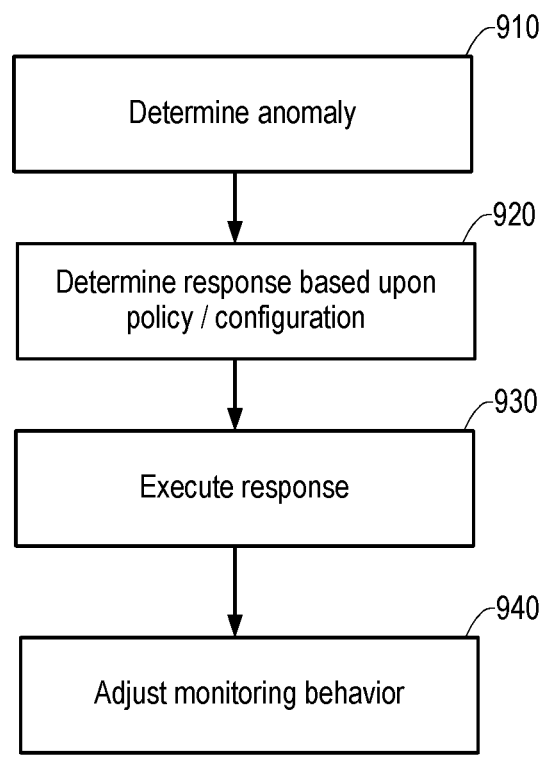
FIG. 9 is a flowchart of a method for anomaly detection in the security groups of FIG. 7.

FIG. 9 is a flowchart of a method for anomaly detection in the security groups of FIG. 7. In an embodiment, communication nodes such as the node 100 (FIG. 1), the first node 221 (FIG. 2) or the first node 710 (FIG. 7), may include an anomaly detection and response function which performs the method 900 depicted in FIG. 9. The method 900 can be used, for example, to detect communication anomalies, generate a hypothesis as to the cause of the anomaly and execute a response. Such hypotheses can be referred to herein as a threat hypothesis or a cause hypothesis. An anomaly detection and response function may be located, independently in each communication node (e.g., within the first node 221). Alternatively, some or all of the functions of the method 900 may be performed by one or more centralized nodes, such as configuration server 210 (FIG. 2), by the controller 705 (FIG. 7) or in a cloud service across a distributed set of nodes (e.g., the security groups 740, 750).

The following description uses the node 221, and more specifically, the security engine 300 of the first node 221 as an example. This is not limiting and the method 900 can be implemented by embodiments of the various nodes described herein. At step 910, the processing unit 321 may receive, store and process metrics from encrypted communication port 313 (e.g., "port metrics") relating to the quantity and rate of corrupted, damaged, lost and/or retransmitted packets. Such port metrics can include one or more of physical layer (PHY) CRC failures, media access control (MAC) layer retransmissions, and TCP/IP retransmission, for example. Additionally, the processing unit 321 may determine, count and process one or more ODSP anomaly metrics. For example, an ODSP anomaly metric may be a total number of digital signature verification failures associated with ODSP communication received from another node within a security group. An ODSP anomaly metric may also be the number of digital signature verification failures over a period of time (e.g. 10 seconds, 30 minutes). The number of failures can further be optionally normalized by the number of total signature verification attempts that occur.

In step 910, the processing unit 321 may process this information by comparing the port metrics and ODSP anomaly metrics to one or more corresponding threshold values. Such threshold values may be fixed or variable. The threshold values may further be set or modified by, for example, the controller 705. If the metrics are above the relevant threshold value, the processing unit 321 may determine that an anomaly has occurred. For example, a threshold value can be set for MAC layer retransmissions, for example, at 15 percent over a 10 second period. Thus, if the number of MAC layer retransmissions is greater than 15% over a 10 second period, an anomaly may be declared. Alternatively, if two or more ODSP digital signature verification failures occurs over a monitoring period, the processing unit 321 can determine that an anomaly has occurred. In another embodiment, thresholds or threshold values for may be set by one or more nodes (e.g., the first node 710 or the second node 720) with particular roles (e.g., administrator node) within, for example, the first security group 740. Threshold levels can also be established in a hybrid manner wherein a base threshold may be established a priori by policy or provisioning, after which various refinements can be dynamically applied via the nodes based on operating conditions. This is described in more detail below.

Additionally, in step 910 the processing unit 321 can determine a cause hypothesis and severity metric. To create a cause hypothesis, the processing unit 321 can logically combine information regarding more than one anomaly and compare the combination to a threshold. For example, consider an anomaly detection and response function which uses a monitoring period of 5 minutes. If during this period, the first node 221 detects one or more anomalies, the information may be combined and evaluated using a look-up table such one exemplary version depicted below.

| Port metrics | ODSP metrics | Cause Hypothesis | Severity |
| --- | --- | --- | --- |
| MAC retransmissions >10% | Digital Signature failures = 0 | Operational Failure | 1 |
| MAC retransmissions >10% | Digital Signature failures between 1-3 | Possible Threat | 2 |
| MAC retransmissions >10% | Digital Signature failures >3 | Probably Threat | 3 |
| MAC retransmissions >25% | Digital Signature failures >3 | Likely Threat | 4 |

In the foregoing table, one port metric (MAC retransmissions) and one ODSP metric (digital signature failures) may be collected over a period of time and compared to a number of thresholds, each threshold representing a cause hypothesis and an overall severity level.

In a further embodiment, the processing unit 321 can include historical values of both port metrics and ODSP metrics in the determination of an anomaly, cause hypothesis, and severity. For example, if within the five previous monitoring periods there were at least four anomalies, then the thresholds used to evaluate metrics during the current monitoring period may, for example, be reduced by one-third, making the system more sensitive to ongoing problems. Such a reduction can further amplify the result indicating that a substantial communication problem is likely present. If operations later return to normal (e.g., there are no anomalies over the five previous monitoring periods), the thresholds may return to their normal levels.

Anomalies from multiple nodes may be combined to form a security group anomaly metric set including an overall cause hypothesis and severity level. For example, in a security group having 16 members, a security group anomaly metric set may be determined as the highest severity metric reported from all 16 members over a monitoring period. Alternatively, a security group metric may be the mean, median, or some other mathematical, statistically relevant, or logical combination of the 16 security metrics.

Additionally, anomalies from multiple security groups (e.g., the first security group 740 and the second security group 750) may be combined to form an overall, anomaly metric set for the system 700, for example, including a cause hypothesis and a severity level. Methods to determine a system anomaly metric may be similar to those used to determine a security group anomaly metric.

Determination of Response

In step 920 the processing unit 321 can use one or more anomalies along with their cause hypothesis and severity level, among other aspects, to determine a response. The response may consist of action designed to correct one or more secure communication links that are no longer functioning and/or communicate and escalate the potential for a security breach/hack.

The determination of a response may be based on anomalies from a single node such as the first node 710 or the second node 720 (e.g., when the anomaly detection and response function is located within a single node), or may be based upon a security group anomaly metric or system anomaly metric.

In an embodiment, the processing unit 321 can determine a response to resynchronize the communication links in one or more security groups. This response may be determined based upon an anomaly metric being larger than a threshold. For example, if a security group severity metric is equal to 3 (e.g., "Probably a Threat," using the above table), then the processing unit 321 may elect to, or cause a resynchronization of all of the communication links within the security group having the metric above this value in response to the anomaly detection.

In an embodiment, the response may involve multiple thresholds with different responses.

Continuing the example above, if a security group metric is equal to 4, for example, then the anomaly detection and response function may decide to resync all of the communication links, for all of the security groups for nodes that are a member of the security group having such a high severity. If more than one security group metric is equal to 4, then the response may be to resync the communication links for all nodes in all security groups in the network.

In each of the above examples, thresholds and responses may be configured by the network operator using, for example, configuration server 210, or the controller 705. Definitions of anomaly metrics and thresholds may be loaded to each node during provisioning or after deployment. Different nodes may be configured to have differing thresholds. For example, a node may be configured to generate an anomaly event with a low threshold if the node is involved in highly sensitive communication, such as a financial transaction. A higher threshold may be established, or a simpler logical combining of metrics may be used for nodes performing less critical roles.

In an embodiment, a response may be determined by combining information determined by the anomaly detection and response function with information generated by one or more external network intrusion detection systems.

Execute Response

In step 930, a resynchronization response may be performed using a number of methods. For example, a resync could be performed by sending a message from the controller 705 to all nodes in the first security group 740, for example. The message may command the use of a reinitialization seed value, contained in the SDS common to members (e.g., the first node 710 and the second node 720) of the security group, in order to compute, for example, the new cipher key and cipher suite used in the next communication session. Alternatively, a new seed could be programmed into each of the nodes of the security group by secure communication from the controller 705, for example, via a new SDS.

In the case where the resynchronization is not managed by a central authority (e.g., the controller 705 or the configuration server 210), when a node determines to resynchronize itself (e.g. using a reinitialization seed value), it may send a "pending resync" message to all other nodes in the security group to inform them that they will also need to resynchronize. The message may initially be sent securely using the existing SDS parameters. In an embodiment, each node which can "hear" or receive the message will acknowledge receipt. To avoid a message "storm", if a node receives a resync pending message, it will only acknowledge receipt and not send out its own pending resync message. If the originator of the pending resync message does not receive acknowledgements from all nodes in the security group, it may request a resync procedure through use of a provisioning node (e.g., the controller 705). If this fails or is not possible, a node may send a pending resync message either using an alternate security method (e.g., a non-ODSP solution) or without security at all.

In an embodiment, a response in step 930 may include a change to cipher key or the frequency of cipher key rotation. For example, if in steps 910 and 920 it is determined that a threat is possible (e.g. severity level 2), but not likely or probable, then instead of initiating a resync event, which has certain performance penalties, an increased cipher key rotation frequency may be used as a response. For example, if the controller 705 has calculated that the first security group 740 severity metric equals 2, then the controller 705 may communicate a message to all members of the first security group 740, causing a reduction in a cipher key rotation frequency parameter (e.g., from rotation once every 5 TCP/IP sessions to once every 2 TCP/IP sessions). In another embodiment, the controller 705 can cause the first node 710 or the second node 720 to replace first cipher key with a second cipher key in response to the cause or threat hypothesis. This can be a part of affecting the cipher key rotation frequency or may be a one-time cipher key replacement in response to the cause hypothesis.

A further response to an anomaly is the generation of a threat message or alert. This message may include the severity level as reported by the system, the group or the node. The message may also contain information relating to which nodes have detected an anomaly and may further include the history of anomalies.

Adjust Behavior

Optionally, in step 940, the processing unit 321 can modify the behavior of the anomaly detection and response determination as a function of information collected over time. In an embodiment, anomaly metrics and thresholds may be adjusted based upon information learned about the network over time. For example, it may be determined that nodes in a security group, communicating via noisy wireless links, tend to generate a high quantity of anomaly events which are unrelated to security threats. For these nodes, the thresholds may be adjusted higher to reduce the prevalence of falsely classifying an anomaly as a threat.

In a further embodiment, the processing unit 321 can characterize a "normal" level of anomalous behavior during a period of known, safe operation. For example, a network may be temporarily isolated from external threats, or it may be determined, after the fact, that for a period of 7 days, a network was not attacked by a malicious party (e.g. using another intrusion threat or detection systems). This information may be used to create a "normal" range for each anomaly metric. Thresholds may then be set above this normal range in order to reduce the prevalence of false alarms.

In an embodiment, the processing unit 321 can determine the process by which a "normal" range for anomaly metrics and appropriate threshold values via a machine learning system. For example, a supervised classification system, such as a support vector machine or a decision tree, may be used by the anomaly detection and response function. In this example, a set of training data is established by allowing the system to operate during periods of known "normal" operation, then adding periods in which the network is subject to a set of security testing protocols (or intentional "hacks"). The metrics collected under each condition are combined and a machine learning system is trained in order to establish the metric thresholds above which an anomaly is declared. One skilled in the art would appreciate that the set of metrics (or "features" as they are commonly called in machine learning) may be further extended to improve performance of the classifier.

In a further embodiment, unsupervised and on-line classification or clustering systems are employed. With these methods, the step of developing valid training data is eliminated and the machine learning system may use existing data and continue to adapt behavior over time.

Those of skill will appreciate that the various illustrative logical blocks, modules, units, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular constraints imposed on the overall system. Skilled persons can implement the described functionality in varying ways for each particular system, but such implementation decisions should not be interpreted as causing a departure from the scope of the invention. In addition, the grouping of functions within a unit, module, block, or step is for ease of description. Specific functions or steps can be moved from one functional block, unit, module, or block without departing from the invention.

The various illustrative logical blocks, units, steps and modules described in connection with the embodiments disclosed herein can be implemented or performed with a processor. As used herein a processor may be a general purpose processor, a digital signal processor (DSP), an application specific integrated circuit (ASIC), a field programmable gate array (FPGA) or other programmable logic device, discrete gate or transistor logic, discrete hardware components, or any portion or combination thereof that is capable of performing the functions described herein. A general purpose processor can be a microprocessor, but in the alternative, the general purpose processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm and the processes of a functional block, step, or module described in connection with the embodiments disclosed herein can be embodied directly in hardware, in a software module executed by a processor, or in a combination of the two. A software module can reside in RAM memory, flash memory, ROM memory, erasable programmable read-only memory (EPROM) memory, electrically erasable programmable read-only memory (EEPROM) memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC. Additionally, device, blocks, or modules that are described as coupled may be coupled via intermediary device, blocks, or modules. Similarly, a first device may be described as transmitting data to (or receiving from) a second device when there are intermediary devices that couple the first and second device and also when the first device is unaware of the ultimate destination of the data.

Those of skill will appreciate that the various illustrative logical blocks (e.g., the various servers described herein), modules, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the design constraints imposed on the overall system. Skilled persons can implement the described functionality in varying ways for each particular application, but such implementation decisions should not be interpreted as causing a departure from the scope of the disclosure. In addition, the grouping of functions within a module, block or step is for ease of description. Specific functions or steps can be moved from one module or functional block without departing from the disclosure.

The various illustrative logical blocks and modules (e.g., the various servers described herein) described in connection with the embodiments disclosed herein can be implemented or performed with a general purpose processor, a digital signal processor (DSP), application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and a method or apparatus may contain additional blocks or elements.

What is claimed is:

1. A method for secure communication, the method comprising:
    storing, at a first node of a first security group of one or more security groups, a parameter data set containing a plurality of values, the first security group having a first plurality of nodes each having a synchronized data set, the synchronized data set having at least a first seed value;
    selecting, using the first seed value, one or more of the plurality of values in the parameter data set to form a first parameter subset;
    generating a first cipher key using the first parameter subset at the first node;
    encrypting user data at the first node using the first cipher key;
    generating a first signature based on the user data;
    transmitting, from the first node to a second node of the first security group, a start frame including the parameter data set, the encrypted user data, and the first signature at a first signature location in the start frame;
    receiving the start frame at the second node;
    selecting one or more of the plurality of values in the parameter data set in the received start frame using the first seed value stored at the second node, to form a second parameter subset equivalent to the first parameter subset;
    generating the first cipher key using the second parameter subset;
    decrypting the encrypted user data using the first cipher key; and
    verifying the first signature in the received start frame.

2. The method of claim 1, wherein the synchronized data set comprises the first seed value and a member ID for each node of the first plurality of nodes associated with first security group.

3. The method of claim 2 further comprising:
    receiving the synchronized data set at the first node, the second node, and a third node, the synchronized data set including the first seed value and a member ID for each of the first node, the second node, and the third node; and
    communicating with the third node within the first security group based on the synchronized data set.

4. The method of claim 1 further comprising:
    receiving, at the second node an instruction to remove the synchronized data set
    deleting the synchronized data set of the second node; and
    removing the second node from the first security group based on the deleting.

5. The method of claim 1 wherein each node of the first plurality of nodes is one of a mobile electronic device, an open systems interconnection (OSI) model layer, an application, and a user profile.

6. The method of claim 1 further comprising:
    storing the synchronized data set to one of a centralized server and a block chain; and
    enabling distributed communications within the first security group based on the storing.

7. The method of claim 1, further comprising assigning a role to each node of the first plurality of nodes of the first security group, each role having a permission level associated with a respective action.

8. The method of claim 7, further comprising:
    assigning a trust metric to each node of the first plurality of nodes of the first security group;
    modifying the trust metric based at least in part on a communication history related to communications with other nodes in the first security group; and
    adjusting the permission level based on the modifying.

9. The method of claim 1, further comprising:
    determining an anomaly based on the verifying and a threshold associated with a number of detected anomalies; and
    determining a cause hypothesis based on the detected anomalies.

10. The method of claim 9, further comprising replacing the cipher key with a second cipher key in response to the threat hypothesis.

11. A system with secure communication within a security group having a first plurality of nodes, the system comprising:
    a first node of the security group, each node of the security group having a synchronized data set, the synchronized data set having at least a first seed, the first node being configured to
    store a parameter data set containing a plurality of values;
    select, using the first seed value, one or more of the plurality of values in the parameter data set to form a first parameter subset;
    generate a first cipher key using the first parameter subset at the first node;
    encrypt user data at the first node using the first cipher key;
    generate a first signature based on the user data;
    transmit a start frame including the parameter data set, the encrypted user data, and the first signature at a first signature location in the start frame; and
    a second node storing the synchronized data set and configured to
    receive the start frame;
    select one or more of the plurality of values in the parameter data set in the received start frame using the first seed value stored at the second node, to form a second parameter subset equivalent to the first parameter subset;
    generate the first cipher key using the second parameter subset;
    decrypt the encrypted user data using the first cipher key; and
    verify the signature in the received start frame.

12. The system of claim 11, wherein the synchronized data set comprises the first seed value and a member ID for each node of the first plurality of nodes associated with first security group.

13. The system of claim 12 wherein the first node and the second node are further configured to:
    receive an updated version of the synchronized data set including the first seed value and a member ID for each of the first node, the second node, and a third node; and
    communicate with the third node within the first security group based on the synchronized data set based on the updated version of the synchronized data set.

14. The system of claim 13 wherein the first node and the second node are assigned a role, each role having a permission level associated with a respective action.

15. A method for secure communication, the method comprising:
    storing, at a first node of a first security group of one or more security groups, a parameter data set containing a plurality of values, the first security group having a first plurality of nodes each having a synchronized data set, the synchronized data set having at least a first seed value;

selecting, using the first seed value stored at the first node, one or more of the plurality of values in the parameter data set to form a first parameter subset;

generating a first cipher key at the first node using the first parameter subset;

encrypting user data at the first node using the first cipher key;

generating a first signature based at least the user data; and transmitting, from the first node to a second node of the first security group, a first start frame including the parameter data set, first encrypted user data, and the first signature at a first signature location in the first start frame.

16. The method of claim 15 further comprising:

receiving, at the first node, a message including second encrypted user data, and a second signature at a second signature location in the second frame;

decrypting the user data using the first cipher key;

verifying the second signature at the second signature location in the received second frame.

17. The method of claim 15, wherein the synchronized data set comprises the first seed value and a member ID for each node of a first plurality of nodes associated with first security group.

18. The method of claim 17 further comprising:

transmitting, by the first node, the synchronized data set to a third node; and communicating with the third node within the first security group based on the synchronized data set.

19. The method of claim 17 further comprising:

receiving information related to the removal of the second node from the first security group; and removing the second node from the first security group based on the receiving.

20. The method of claim 17, wherein each node of the first plurality of nodes is one of a mobile electronic device, an open systems interconnection (OSI) model layer, an application, and a user profile.

21. The method of claim 17, further comprising:

receiving a message related to the role of the first node, the role having a permission level associated with a respective action.

22. The method of claim 15, further comprising:

assigning a trust metric, by the first node, to every node of the first plurality of nodes of the first security group;

modifying the trust metric based at least in part on a communication history related to communications with the first node within the first security group; and adjusting the permission level based on the modifying.

* * * * *